US012810764B2

(12) United States Patent
Lee et al.

(10) Patent No.: US 12,810,764 B2
(45) Date of Patent: Nov. 24, 2026

(54) DATA PROCESSING CIRCUIT, DISPLAY DRIVER OF DISPLAY DEVICE AND DATA PROCESSING METHOD

(71) Applicant: Samsung Display Co., LTD., Yongin-si (KR)

(72) Inventors: Sooyeon Lee, Yongin-si (KR); Jong-Woong Park, Yongin-si (KR); Yunki Baek, Yongin-si (KR); Wonbok Lee, Yongin-si (KR); Hyeonmin Kim, Yongin-si (KR); Hye-Sang Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 129 days.

(21) Appl. No.: 18/888,485

(22) Filed: Sep. 18, 2024

(65) Prior Publication Data

US 2025/0265961 A1 Aug. 21, 2025

(30) Foreign Application Priority Data

Feb. 19, 2024 (KR) ........................ 10-2024-0023842

(51) Int. Cl.

*G06T 9/00* (2006.01)
*G09G 3/20* (2006.01)
*G09G 3/32* (2016.01)

(52) U.S. Cl.

CPC ............. *G09G 3/2092* (2013.01); *G06T 9/00* (2013.01); *G09G 3/32* (2013.01); (Continued)

(58) Field of Classification Search

None
See application file for complete search history.

(56) References Cited

U.S. PATENT DOCUMENTS 7,343,037 B1 * 3/2008 Kadatch ................ H04N 1/644 382/166
9,830,890 B2 11/2017 Zhou et al.
(Continued)

FOREIGN PATENT DOCUMENTS

KR 101127221 B1 3/2012
KR 101310380 B1 9/2013
(Continued)

*Primary Examiner* — Yanna Wu
(74) *Attorney, Agent, or Firm* — CANTOR COLBURN LLP

(57) ABSTRACT

A data processing circuit includes an encoder, a memory device and a decoder. The encoder generates an encoded bitstream by compressing an input frame including a plurality of samples forming a plurality of sample lines, determines a similarity between samples of a current sample line to be encoded and samples of a previous sample line that is encoded previously before the current sample line, determines the samples of the current sample line as redundant samples or non-redundant samples based on the similarity, excludes compressed data corresponding to the redundant samples from the encoded bitstream, and appends to the encoded bitstream a flag indicating a position of the redundant samples. The memory device stores the encoded bitstream. The decoder extracts the flag from the encoded bitstream provided from the memory device and generates a reconstructed frame by decompressing the encoded bitstream based on the flag.

19 Claims, 19 Drawing Sheets

(52) U.S. Cl.
CPC ............... *G09G 2320/0252* (2013.01); *G09G 2320/0257* (2013.01); *G09G 2340/0407* (2013.01)

(56) References Cited

U.S. PATENT DOCUMENTS

| | | | | |
|---|---|---|---|---|
| 11,244,476 | B2 | 2/2022 | Thirumalai | |
| 11,503,322 | B2 | 11/2022 | Thirumalai | |
| 11,509,897 | B2 * | 11/2022 | Thirumalai .......... | H04N 19/126 |
| 2015/0049804 | A1 * | 2/2015 | Shimada .............. | H04N 19/463 375/240.03 |

FOREIGN PATENT DOCUMENTS

| | | | |
|---|---|---|---|
| KR | 101363652 | B1 | 2/2014 |
| KR | 1020230040793 | A | 3/2023 |
| KR | 1020240020691 | A | 2/2024 |

* cited by examiner

100

200

⋮

| | | | | | |
|---|---|---|---|---|---|
| SLi | S'(i,1) | S'(i,2) | S'(i,3) | ⋯ | S'(i,k) |
| SLi+1 | S(i+1,1) | S(i+1,2) | S(i+1,3) | ⋯ | S(i+1,k) |

⋮

DATA PROCESSING CIRCUIT, DISPLAY DRIVER OF DISPLAY DEVICE AND DATA PROCESSING METHOD

This application claims priority to Korean Patent Application No. 10-2024-0023842, filed on Feb. 19, 2024, and all the benefits accruing therefrom under 35 U.S.C. § 119, the content of which in its entirety is herein incorporated by reference.

BACKGROUND

1. Technical Field

Example embodiments relate generally to display devices, and more particularly to a data processing circuit, a display driver of a display device, and a data processing method.

2. Discussion of the Related Art

Due to small size, high image quality, and low power consumption, flat panel displays such as, for example, liquid crystal displays (LCDs) and light emitting diode (LED) displays are widely used. The pixels on a display panel have a specific response time. The data fed to the pixel and displayed by the pixel may change faster than the pixel can react. Because of the delayed response of the pixel, undesirable effects such as, for example, motion blur or ghost effect may appear. To improve the quality of the displayed image, image correction techniques may be used. An overdriving algorithm has been developed to compensate the image data to reduce the motion blur exhibited by the displayed pixels.

SUMMARY

Some example embodiments may provide a data processing circuit and a data processing method to provide data for overdriving compensation of a display device.

Some example embodiments may provide a display device of a display device including the data processing circuit.

According to example embodiments, a data processing circuit to provide data for overdriving compensation of a display device, includes, an encoder, a memory device and a decoder. The encoder generates an encoded bitstream by compressing an input frame including a plurality of samples forming a plurality of sample lines, determines a similarity between samples of a current sample line to be encoded and samples of a previous sample line that is encoded previously before the current sample line, wherein the samples of the current sample line and the samples of the previous sample line are included in the plurality of samples, determines the samples of the current sample line as redundant samples or non-redundant samples based on the similarity, excludes compressed data corresponding to the redundant samples from the encoded bitstream, and appends to the encoded bitstream a flag indicating a position of the redundant samples. The memory device stores the encoded bitstream. The decoder extracts the flag from the encoded bitstream provided from the memory device and generates a reconstructed frame by decompressing the encoded bitstream based on the flag.

In some example embodiments, the encoder may be configured to determine the similarity based on an absolute value of a difference between a current sample included in the current sample line and a comparison sample included in the previous sample line and adjacent to the current sample.

In some example embodiments, the encoder may be configured to append to the encoded bitstream the flag having a first value at a position where the compressed data corresponding to the redundant samples is excluded, and append to the encoded bitstream the flag having a second value at a position before the compressed data corresponding to the non-redundant samples.

In some example embodiments, the encoder may be configured to determine all samples of the current sample line as the redundant samples when a summed value of absolute values with respect to the current sample line is less than or equal to a threshold value, where each absolute value corresponds to a difference between a current sample included in the current sample line and a comparison sample included in the previous sample line and adjacent to the current sample.

In some example embodiments, the encoder may be configured to group the samples included in the current sample line into a plurality of sample blocks such that each sample block has a fixed number of samples, and determine all samples of each sample block as the redundant samples when a summed value of absolute values with respect to each sample block is less than or equal to a threshold value where each absolute value corresponds to a difference between a current sample included in the current sample line and a comparison sample included in the previous sample line and adjacent to the current sample.

In some example embodiments, the encoder may be configured to determine a current sample as the redundant sample when an absolute value of a difference between the current sample included in the current sample line and a comparison sample included in the previous sample line and adjacent to the current sample is less than or equal to a threshold value.

In some example embodiments, the encoder may be configured to append to the encoded bitstream the flag having a first value at a position where the compressed data corresponding to the redundant samples is excluded, and append to the encoded bitstream a redundancy depth value at a position after the flag having the first value, wherein the redundancy depth value indicates a number of consecutive redundant samples.

In some example embodiments, when the flag has a first value, the decoder may be configured to generate reconstructed samples corresponding to the redundant samples of the current sample line by copying the reconstructed samples of the previous sample line. When the flag has a second value, the decoder may be configured to generate reconstructed samples corresponding to the non-redundant samples by decompressing the compressed data after the flag having the second value.

In some example embodiments, the encoder may be configured to determine an encoding selection option among a plurality of prediction options corresponding to different combinations of neighboring samples adjacent to a current sample to be encoded, and generate a prediction sample for encoding the current sample based on reconstructed samples corresponding to the neighboring samples according to the encoding selection option.

In some example embodiments, the encoder may be configured to determine the encoding selection option based on a parent sample that is included in the current sample line and is encoded previously before the current sample. The decoder may be configured to, without receiving information on the encoding selection option from the encoder, determine a decoding selection option among the plurality of prediction options based on a reconstructed sample that is generated by decoding the compressed data corresponding to the parent sample, and generate a prediction sample for decoding the compressed data corresponding to the current sample based on reconstructed samples corresponding to the neighboring samples according to the decoding selection option.

In some example embodiments, the encoder may be configured to omit encoding with respect to at least one color channel among a plurality of color channels. The decoder may be configured to generate decoded data of the at least one color channel for which encoding is omitted, based on decoded data of other channels in which encoding is not omitted.

In some example embodiments, the encoder may be configured to group the plurality of sample lines into a plurality of slices, and perform encoding in parallel with respect to the plurality of slices.

In some example embodiments, the data processing circuit may further includes a sampler configured to generate the plurality of samples by grouping pixels of input image data or scaling each pixel to a sample having a reduced quantity of bits compared to the pixel.

In some example embodiments, the encoder may include a subtractor configured to generate a residue by subtracting a prediction sample from a current sample, a quantizer configured to generate a quantized value by quantizing the residue, an entropy encoder configured to generate an encoded bitstream based on the quantized value and the flag, a reconstructor configured to generate a reconstructed sample based on the quantized value and the prediction sample, a predictor configured to generate the prediction sample based on reconstructed samples corresponding to previously encoded samples, and a redundancy detector configured to generate the flag based on the reconstructed sample and the current sample.

In some example embodiments, the decoder may include an entropy decoder configured to generate the flag and a quantized value based on the encoded bitstream, an inverse quantizer configured to generate a reconstructed residue based on the quantized value and a reconstructed sample, an adder configured to generate the reconstructed sample by summing the reconstructed residue and a prediction sample, a predictor configured to generate the prediction sample based on previously decoded reconstructed samples, and an output circuit configured to generate the reconstructed frame based on the reconstructed sample and the flag.

According to example embodiments, a display driver of a display device a sampler configured to generate, by sampling input image data, an input frame including a plurality of samples forming a plurality of sample lines, an encoder configured to generate an encoded bitstream by compressing the input frame, determine a similarity between samples of a current sample line to be encoded and samples of a previous sample line that is encoded previously before the current sample line, wherein the samples of the current sample line and the samples of the previous sample line are included in the plurality of samples, determine the samples of the current sample line as redundant samples or non-redundant samples based on the similarity, exclude compressed data corresponding to the redundant samples from the encoded bitstream, and append to the encoded bitstream a flag indicating a position of the redundant samples, a memory device configured to store the encoded bitstream, a decoder configured to extract the flag from the encoded bitstream provided from the memory device and generate a reconstructed frame by decompressing the encoded bitstream based on the flag, a data compensation circuit configured to generate output image data by compensating the input image data based on the reconstructed frame, and a data driver configured to provide data signals to pixels of the display device based on the output image data.

In some example embodiments, the encoder may be configured to determine the similarity based on an absolute value of a difference between a current sample included in the current sample line and a comparison sample included in the previous sample line and adjacent to the current sample.

In some example embodiments, when the flag has a first value, the decoder may be configured to generate reconstructed samples corresponding to the redundant samples of the current sample line by copying the reconstructed samples of the previous sample line. When the flag has a second value, the decoder may be configured to generate reconstructed samples corresponding to the non-redundant samples by decompressing the compressed data after the flag having the second value.

In some example embodiments, the encoder may be configured to determine an encoding selection option among a plurality of prediction options corresponding to different combinations of neighboring samples adjacent to a current sample to be encoded, and generate a prediction sample for encoding the current sample based on reconstructed samples corresponding to the neighboring samples according to the encoding selection option.

According to example embodiments, a data processing method to provide data for overdriving compensation of a display device, includes, generating an encoded bitstream by compressing an input frame including a plurality of samples forming a plurality of sample lines, determining a similarity between samples of a current sample line to be encoded and samples of a previous sample line that is encoded previously before the current sample line wherein the samples of the current sample line and the samples of the previous sample line are included in the plurality of samples, determining the samples of the current sample line as redundant samples or non-redundant samples based on the similarity, excluding compressed data corresponding to the redundant samples from the encoded bitstream, appending to the encoded bitstream a flag indicating a position of the redundant samples, storing the encoded bitstream in a memory device, extracting the flag from the encoded bitstream provided from the memory device, and generating a reconstructed frame by decompressing the encoded bitstream based on the flag.

In the data processing circuit, the data processing method, and the display driver according to example embodiments, by replacing the redundant compressed data with the flags based on the similarity between the encoded comparison sample and the sample to be encoded, the size of the memory device storing data for overdriving compensation may be reduced while minimizing data loss. The encoding time, the decoding time, and the size of the bitstream may be reduced and the performance of the device including the data processing circuit may be improved, by replacing the redundant compressed data with the flags.

BRIEF DESCRIPTION OF THE DRAWINGS

Example embodiments will be more clearly understood from the following detailed description taken in conjunction with the accompanying drawings.

DETAILED DESCRIPTION

Figure 1:
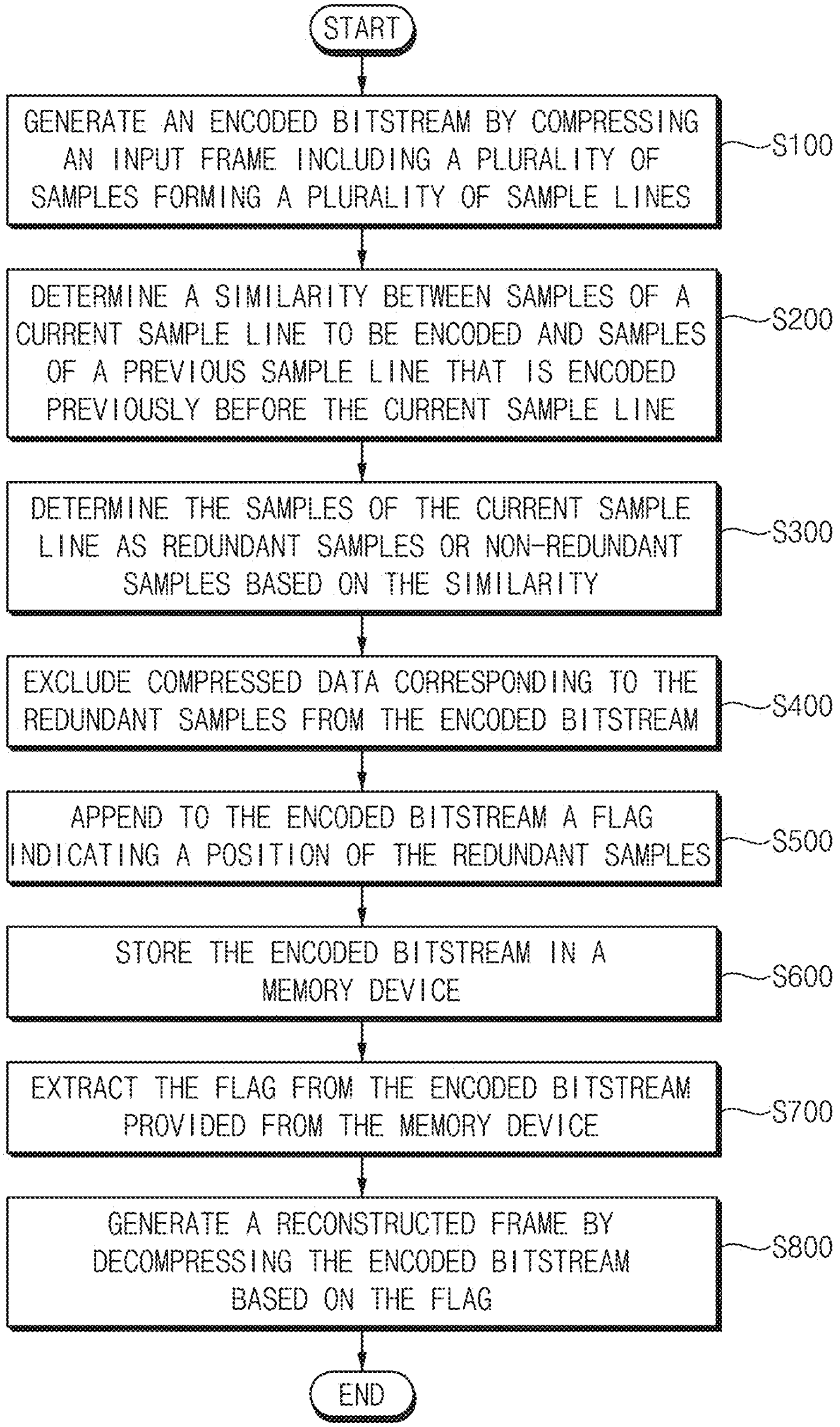
FIG. 1 is a flowchart illustrating a data processing method according to example embodiments.

Various example embodiments will be described more fully hereinafter with reference to the accompanying drawings, in which some example embodiments are illustrated. In the drawings, like numerals refer to like elements throughout. The repeated descriptions may be omitted.

FIG. 1 is a flowchart illustrating a data processing method according to example embodiments. FIG. 1 illustrates a data processing method to provide data for overdriving compensation of a display device.

In the descriptions of the data processing method herein, the operations may be performed in a different order than the order shown and/or described, or the operations may be performed in different orders or at different times. Certain operations may also be left out of the flowcharts, one or more operations may be repeated, or other operations may be added.

Referring to FIG. 1, the data processing method may include generating an encoded bitstream by compressing an input frame including a plurality of samples forming a plurality of sample lines (S100). According to example embodiments, one sample of the input frame may correspond to one pixel of the input image frame, or, one sample of the input frame may correspond to two or more pixels of the input image frame as will be described herein with reference to FIG. 7. In some aspects, in some example embodiments, the quantity of bits in each sample of the input frame may be equal to the quantity of bits in each pixel of the input image frame, or the quantity of bits in each sample of the input frame may be less than the quantity of bits in each pixel of the input image frame, as will be further described herein with reference to FIG. 8.

The data processing method may include determining a similarity between samples of a current sample line to be encoded and samples of a previous sample line that is encoded previously before the current sample line (S200). In an example embodiment, the similarity may be determined based on an absolute value of a difference between a current sample included in the current sample line and a comparison sample included in the previous sample line and adjacent to the current sample. In an example embodiment, the determination of the similarity may be performed on a sample line basis as will be described herein with reference to FIG. 12, on a sample block basis by further dividing the sample line as will be described herein with reference to FIG. 14, or on an individual sample basis as will be described herein with reference to FIG. 15.

The data processing method may include determining the samples of the current sample line as redundant samples or non-redundant samples based on the similarity (S300). The data processing method may include excluding compressed data corresponding to the redundant samples from the encoded bitstream (S400). The data processing method may include appending a flag indicating a position of the redundant samples to the encoded bitstream (S500). The processes S200, S300, S400 and S500 may be performed by an encoder included in the data processing circuit according to example embodiments. Example embodiments of the encoder will be described herein with reference to FIGS. 3 and 4.

The data processing method may include storing the encoded bitstream in a memory device (S600). In an example embodiment, the memory device may be a memory device dedicated to the data processing circuit. In another example embodiment, the memory device may be a common memory that stores various data used by the display device. In this case, a certain area of the common memory may be set as an area for storing the encoded bitstream.

The data processing method may include extracting the flag from the encoded bitstream provided from the memory device (S700). The data processing method may include generating a reconstructed frame by decompressing the encoded bitstream based on the flag (S800). The processes S700 and S800 may be performed by a decoder included in the data processing circuit according to example embodiments. Example embodiments of the decoder will be described herein with reference to FIGS. 5 and 6.

Figure 2:
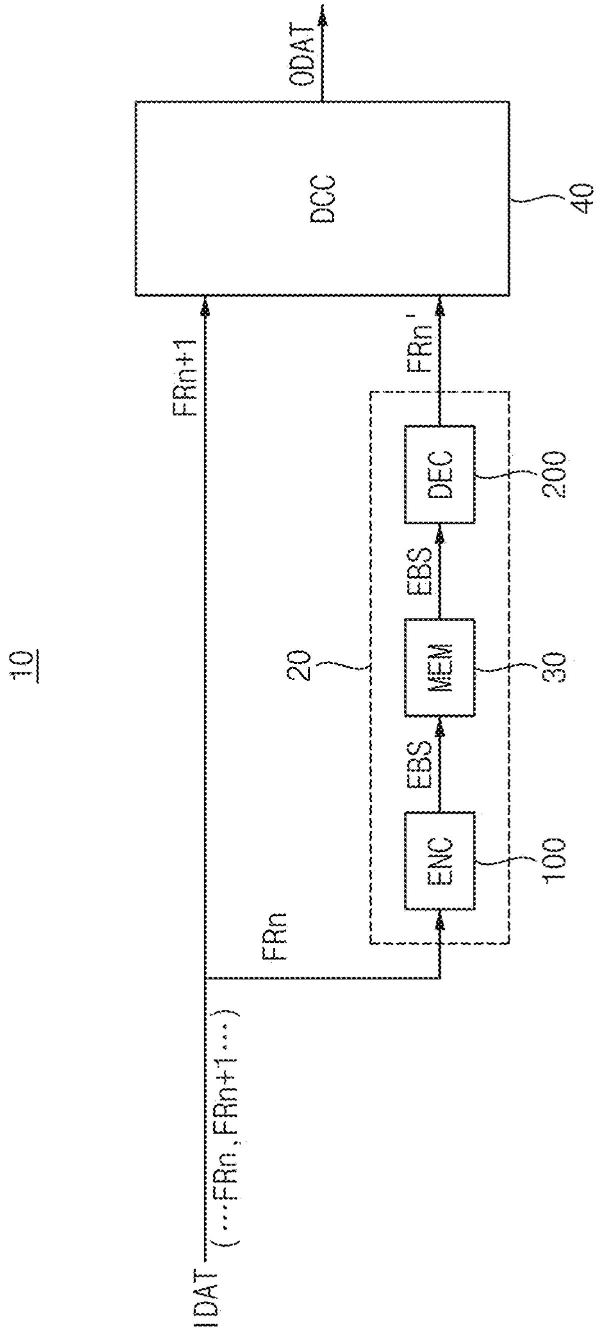
FIG. 2 is a block diagram illustrating a data correction device including data processing circuit according to example embodiments.

FIG. 2 is a block diagram illustrating a data correction device including data processing circuit according to example embodiments.

Referring to FIG. 2, a data correction device 10 may include a data processing circuit 20 and a data compensation circuit (DCC) 40. The data processing circuit 20 may include an encoder (ENC) 100, a memory device (MEM) 30 and a decoder (DEC) 200.

The data correction device 10 may correct input image data IDAT to generate output image data ODAT. The input image data IDAT may be provided in the form of a bitstream and may include a plurality of image frames . . . , FRn, FRn+1, . . . in sequence. The encoder 100 may encode (e.g., compress) the image frame FRn to generate an encoded bitstream EBS, the memory device 30 may store the encoded bitstream EBS, and the decoder 200 may decode (e.g., decompress) the encoded bitstream EBS provided from the memory device 30 to generate a reconstructed frame FRn'. The data compensation circuit 40 may compensate the current image frame FRn+1 based on the reconstructed frame FRn' corresponding to the previous image frame FRn to generate the output image data ODAT. Accordingly, for example, the data correction device 10 may generate the output image data ODAT by correcting the input image data IDAT as described herein.

Storing any data, such as, for example, image frames, may consume a large amount of memory space. According to example embodiments, the encoder 100 and decoder 200 may utilize a smaller storage medium, i.e., the memory device 30, which may reduce space and cost.

As illustrated in FIG. 2, according to an example embodiment, the data processing circuit 20 may form a portion of the data correction device 10, and the data compensation circuit (e.g., an overdriving compensation circuit) within the data correction device 10 may use the previous image frame FRn to compensate the current image frame FRn+1 (e.g., to reduce a ghost effect or motion blur). In an example embodiment, the encoder 100 may further include circuitry (e.g., the sampler SMP of FIG. 3) that performs grouping, truncation, delay, or other processing of the data, and such a sampler SMP may be included in the encoder 100.

For example, the sampler may receive a frame of 8 bits per coding (bpc), truncate the frame (i.e., reduce the number of bpc of pixel values in the frame to, for example, 3 bpc), and delay the frame to generate a previous frame that has been truncated. The data processing circuit 20 may compress and store the previous frame such that the previous frame may be used by the data compensation circuit 40. Here, based on the truncation and compression, the size of the stored frame may be much smaller than the original (previous) frame FRn. For example, for an RGB input frame in which each color value is represented by 8 bits [or 24 bits per pixel (bpp)], truncation may result in a frame representation of 3 bpc/9 bpp, which may be further reduced to 2 bpc/6 bpp for a case in which the encoder 100 performs 1.5:1 compression. However, example embodiments are not limited to RGB input frames, and any suitable input frame format may be used, such as, for example, RGBG [for PENTILE® sub-pixel arrays]. For example, for RGBG input frames, the frame size may be reduced from 16 bpp to 6 bpp by truncation, and the encoder 100 may perform 1.5:1 compression to reduce the size back to 4 bpp.

In an example embodiment, the encoding scheme of the data processing circuit 20 is typically to titrate the mean square error (MSE) or peak signal to noise ratio (PSNR), which means that the polarity of the error in the reconstructed frame FRn' may be positive or negative. According to example embodiments, the reconstruction error, i.e., the error introduced by the data processing circuit 20, may be non-negative (i.e., zero or positive), in which case the performance of the data compensation circuit 40 may be improved.

The data processing circuit 20 may improve the performance of the data compensation circuit 40 by ensuring that the reconstruction error, defined as the difference between the reconstruction frame FRn' and the original frame FRn, which is primarily introduced due to quantization, is always non-negative (i.e., equal to or greater than zero) and limited to less than or equal to a predetermined maximum value.

When storing data compressed, fixed length coding (FLC) and variable length coding (VLC) may be used to ensure a minimum requirement such as, for example, a minimum compression ratio. The coding scheme may be designed to determine the optimal compression tool between variable length compression and fixed length compression by calculating the difference between the total number of bits to be used and the number of bits already used during the compression process, and determining the appropriate level of compression to be applied based on the remaining bits. In some aspects, the coding technique may be limited when accuracy in residue reconstruction is required by applying modulo to allow only positive residues.

Conventional compression or encoding methods are limited in data compression because the methods lack information about the prediction method, are designed and implemented by focusing on adding modulo functions, and do not consider various possibilities such as, for example, the use of line buffers. The conventional method is concerned with compression of the image data itself, and does not consider the specificity of compressing data for purposes such as, for example, overdriving compensation, and the development of compression techniques for overdriving compensation data has not been addressed in detail or the compression has been minimized.

For normal images, pixel-by-pixel information is important, but for compressing images for overdriving compensation, it is more important to determine the flow of changes in the overall RGB signal and determine the amount of compensation based on the flow than the accuracy of the pixel-by-pixel prediction of the image. Applying common image compression techniques to compensated data may be overly complex and accurate. A compression technique is desired that is simple and less tolerant of accuracy for the purpose of determining the amount of compensation for overdriving compensation.

In the data processing circuit, the data processing method and the display driver according to example embodiments, by replacing the redundant compressed data with the flags based on the similarity between the encoded comparison sample and the sample to be encoded, the size of the memory device storing data for overdriving compensation may be reduced while minimizing data loss. The encoding time, the decoding time, and the size of the bitstream may be reduced and the performance of the device including the data processing circuit may be improved, by replacing the redundant compressed data with the flags.

Figure 3:
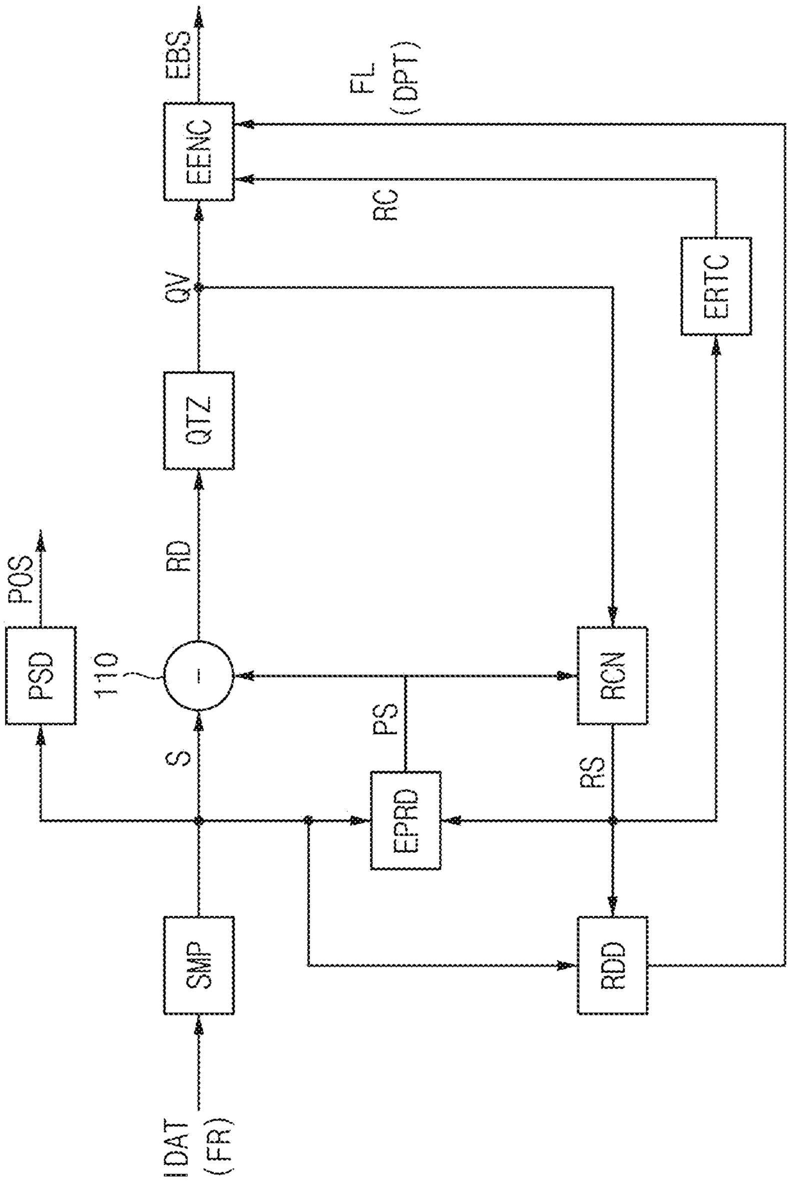
FIG. 3 is a block diagram illustrating an example of an encoder included in a data processing circuit according to example embodiments.

FIG. 3 is a block diagram illustrating an example of an encoder included in a data processing circuit according to example embodiments.

Referring to FIG. 3, an encoder 100 may include a subtractor 110, a quantizer QTZ, an entropy encoder EENC, a reconstructor RCN, a predictor EPRD, and a redundancy detector RDD. According to example embodiments, the encoder 100 may further include a sampler SMP, a position detector PSD, and/or a rate controller ERTC.

The sampler SMP may sample input image data IDAT. The sampler SMP may generate, by sampling the input image data IDAT, an input frame FR including a plurality of samples forming a plurality of sample lines. The sampler SMP may output the plurality of samples of the input frame FR on a sample-by-sample basis, and the sample currently being output by the sampler SMP may be referred to as a current sample S.

The subtractor 110 may subtract a prediction sample PS from the current sample S to generate a residue RD. For example, the subtractor 110 may generate the residue RD by subtracting the prediction sample PS from the current sample S. The quantizer QTZ may quantize the residue RD to generate a quantized value QV. For example, the quantizer QTZ may generate the quantized value QV by quantizing the residue RD.

The entropy encoder EENC may generate an encoded bitstream EBS based on the quantized value QV and a flag FL. According to example embodiments, the entropy encoder EENC may determine an encoding mode to use for entropy encoding based on a control value RC provided from the rate controller ERTC.

The reconstructor RCN may generate a reconstructed sample RS based on the quantized value QV and the prediction sample PS. The predictor EPRD may generate the prediction sample PS based on the reconstructed samples RS corresponding to the previously encoded samples.

The redundancy detector RDD may generate the flag FL based on the reconstructed sample RS and the current sample S. In some example embodiments, the redundancy detector RDD may further generate a redundancy depth value DPT indicating the number of consecutive redundant samples.

The position detector PSD may provide position information POS of the current sample S. Although not illustrated in FIG. 3, the position information POS may be provided to components of the encoder 100 that require a position within the input frame of the current sample S to be encoded. For example, the position information POS may be provided to the redundancy detector RDD, and the redundancy detector RDD may determine whether the current sample line to which the current sample S belongs is the first sample line based on the position information POS. Further, when the redundancy detector RDD determines the similarity on a sample line-by-sample line basis as will be described herein with reference to FIG. 12, the redundancy detector RDD may determine the value of the flag FL at a time when the sample-by-sample encoding EPS for one sample line is completed, based on the position information POS. For example, the position information POS may be provided to the entropy encoder EENC, and the entropy encoder EENC may generate a line-by-line encoded bitstream EBS based on the position information POS.

Figure 4:
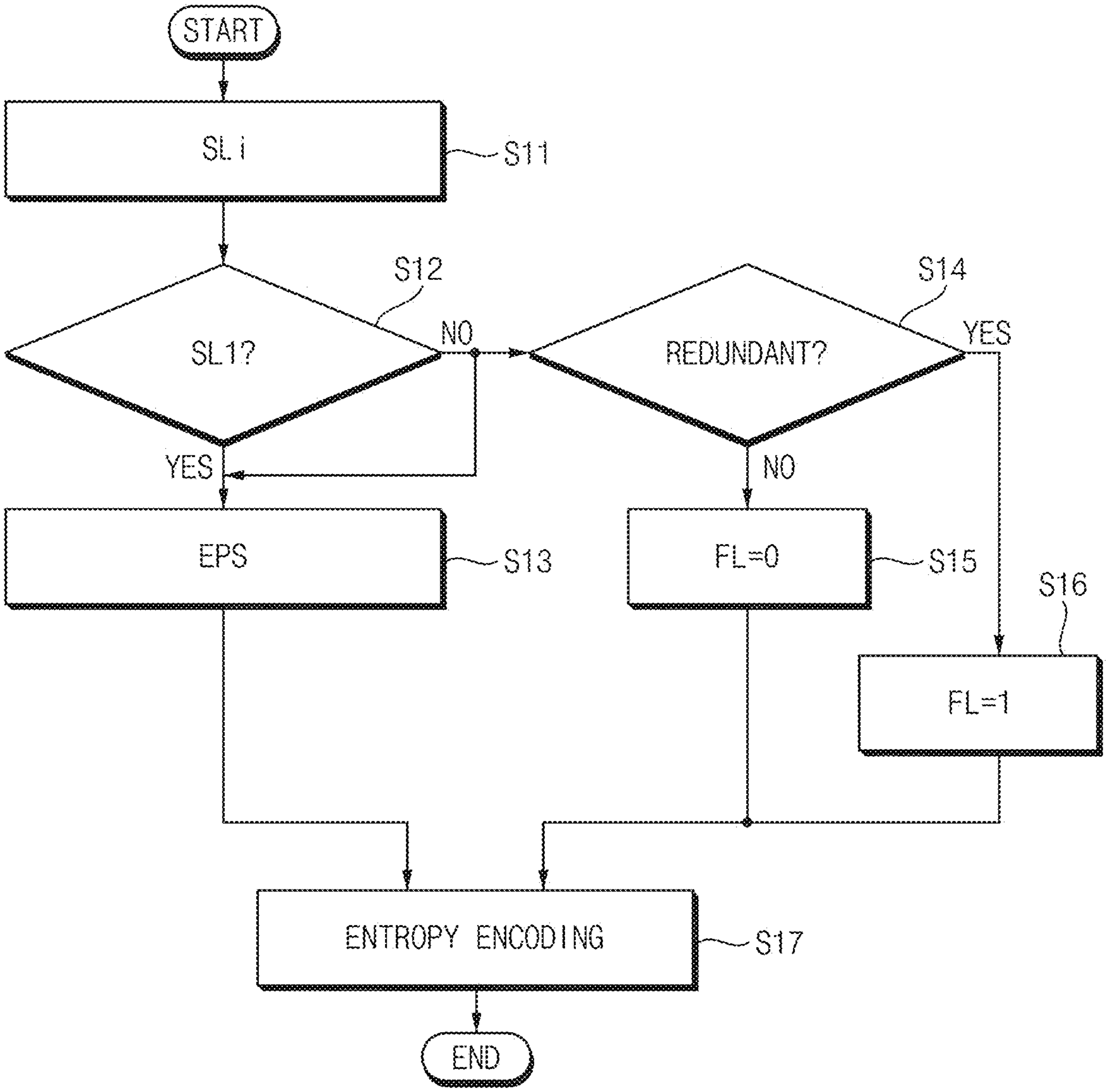
FIG. 4 is a flowchart illustrating an example of encoding in a data processing method according to example embodiments.

FIG. 4 is a flowchart illustrating an example of encoding in a data processing method according to example embodiments. FIG. 4 illustrates an example of encoding corresponding to one current sample line SLi to be encoded. As will be described herein with reference to FIGS. 9, 10 and 11, the sample lines may be encoded sequentially, and the samples included in each sample line may be encoded sequentially.

Referring to FIGS. 3 and 4, the encoder 100 may receive the current sample line SLi (S11) and determine whether the current sample line SLi is the first sample line SL1 (S12) based on the position information POS provided by the position detector PSD. The position information POS may include information regarding the position of the current sample to be encoded within the input frame, i.e., the position of the current sample line SLi to which the current sample belongs, the position of the current sample within the current sample line SLi, and the like.

When the current sample line SLi is the first sample line SL1 (S12: YES), the encoder 100 may perform sample-by-sample encoding EPS to encode the samples included in the current sample line SLi one by one sequentially (S13). In other words, for the first sample line SL1, the redundancy detector RDD may omit the similarity determination, and the entropy encoder EENC may generate an encoded bitstream EBS corresponding to the first sample line SL1 based on the quantized value QV that is generated as a result of the sample-by-sample encoding EPS.

When the current sample line SLi is not the first sample line SL1 (S12: NO), the redundancy detector RDD may determine the similarity between the samples of the current sample line SLi and the samples of the previous sample line that is previously encoded before the current sample line SLi, and the redundancy detector RDD may determine the samples of the current sample line SLi as redundant samples or non-redundant samples based on the similarity (S14).

In an example embodiment, the redundancy detector RDD may determine the similarity based on the absolute value of the difference between the current sample included in the current sample line SLi and a comparison sample included in the previous sample line and adjacent to the current sample. For such similarity determination, the redundancy detector RDD may store the samples of the previous sample line. Example embodiments of determining the similarity and generating the encoded bitstream EBS based on the similarity will be further described herein with reference to FIGS. 11 through 15.

When the sample of the current sample line SLi is determined to be redundant sample (S14: YES), the redundancy detector RDD may set the flag FL to a first value (e.g., '1'). When the sample of the current sample line SLi is determined to be non-redundant sample (S14: NO), the redundancy detector RDD may set the flag FL to a second value (e.g., '0').

When the current sample line SLi is not the first sample line SL1 (S12: NO), the encoder 100 may perform the sample-by-sample encoding EPS (S13) to encode the samples included in the current sample line SLi one by one sequentially, in parallel with the above-described similarity determination.

The entropy encoder EENC may generate the encoded bitstream EBS based on the quantized value QV and the flags FL generated as a result of the sample-by-sample encoding EPS. As will be described herein with reference to FIGS. 11 through 15, the entropy encoder EENC may append to the encoded bitstream EBS the flag FL having a first value at positions where the compressed data corresponding to redundant samples is excluded, and the entropy encoder EENC may append to the encoded bitstream EBS the flag FL having a second value at a position before the compressed data corresponding to the non-redundant samples.

According to the unit of compression (or encoding), that is, according to the size of a predetermined slice or group of pixels, predicted data may be set by referring to the information on the neighboring samples. The residue between the current sample and the corresponding prediction sample may be calculated, and the bit number data (i.e., quantity of bits) to be encoded may be reduced once more through quantization of the residue, followed by entropy encoding to generate the encoded bitstream EBS. In some embodiments, the reconstructed sample information generated by dequantizing the quantized value may be used as data for prediction of the next sample and/or sample line. In this case, the residue information may be either negative or positive, or may be modulo such that the residue information may be negative or positive. Further, based on the encoded value, the bit quantity based on which to compress the remaining samples and/or sample lines (i.e., the quantity of bits according to which to compress the remaining samples and/or sample lines) may be calculated to implicitly determine the codec tool as one of a lossless codec and a lossy codec. The number of lossy codecs may be increased or decreased according to example embodiments. Embodiments of the present disclosure support changing the determined codec mode to another codec mode having a higher or lower compression ratio based on the number of bits remaining.

Entropy encoding may be applied by one or more entropy coding schemes, such as, for example, run-length coding, arithmetic coding, exp-Golomb, Huffman, PCM, ADPCM, CAVLC, CABAC, and the like, singly or in combination.

Figure 5:
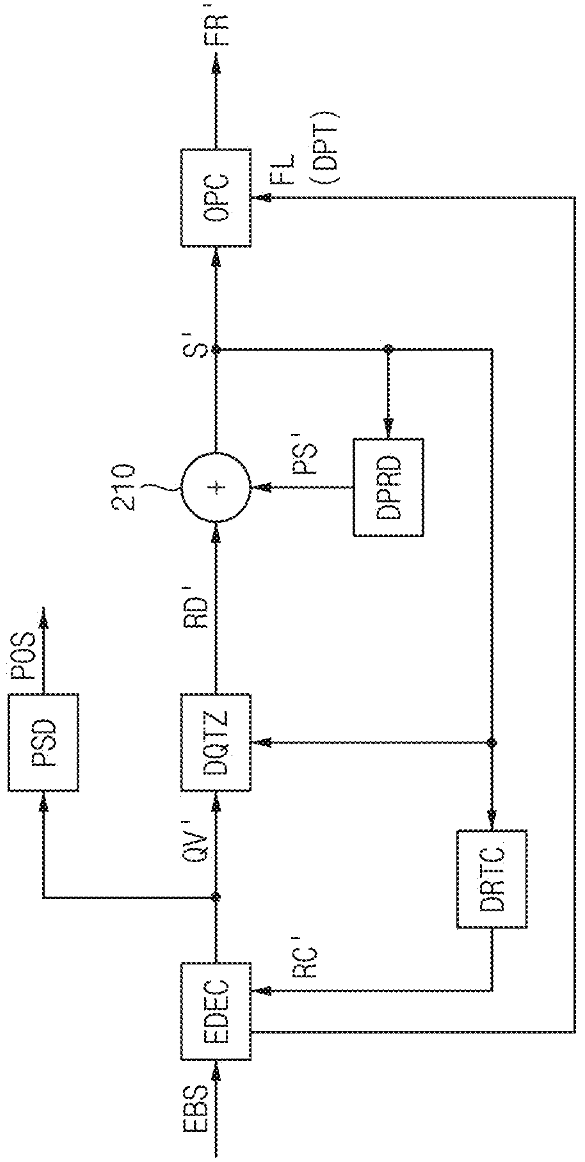
FIG. 5 is a block diagram illustrating an example of a decoder included in a data processing circuit according to example embodiments.

FIG. 5 is a block diagram illustrating an example of a decoder included in a data processing circuit according to example embodiments.

Referring to FIG. 5, a decoder 200 may include an entropy decoder EDEC, a dequantizer DQTZ, an adder 210, a predictor DPRD, and an output circuit OPC. According to example embodiments, the decoder 200 may further include a position detector PSD and a rate controller DRTC.

The entropy decoder EDEC may generate a flag FL and a quantized value QV' based on the encoded bitstream EBS. According to example embodiments, the entropy decoder EDEC may determine a decoding mode to use for entropy decoding based on a control value RC' provided from the rate controller DRTC. Further, according to example embodiments, the encoded bitstream EBS may further include a redundancy depth value DPT indicating the number of the consecutive redundant samples in a line as will be further described herein with reference to FIG. 15, and the entropy decoder EDEC may further extract the redundancy depth value DPT from the encoded bitstream EBS.

The inverse quantizer DQTZ may generate a reconstructed residue RD' based on the quantized value QV' and the reconstructed sample S'. The adder 210 may generate the reconstructed current sample S' by summing the reconstructed residue RD' and the prediction sample PS'. The predictor DPRD may generate the prediction sample PS' based on the previously decoded reconstructed samples S'. As will be described herein with reference to FIGS. 12 and 14, the output circuit OPC may generate a reconstructed frame FR' based on the reconstructed samples S' and the flags FL. According to example embodiments, when the encoded bitstream EBS includes the redundancy depth value DPT, the output circuit OPC may generate the reconstructed frame FR' based on the reconstructed samples S', the flag FL, and the redundancy depth value DPT, as will be further described herein with reference to FIG. 15.

The position detector PSD may provide the position information POS for the currently decoded quantized value QV'. The POS may include information regarding the position in the input frame of the current sample (the sample before it was encoded) corresponding to the quantized value QV' to be decoded, such as, for example, the position of the current sample line SLi to which the current sample belongs, the position of the current sample within the current sample line SLi, and the like. Although not illustrated in FIG. 5, the position information POS may be provided to components of the decoder 200 that require a position in the input frame of the current sample corresponding to the quantized value QV that is currently being decoded.

Figure 6:
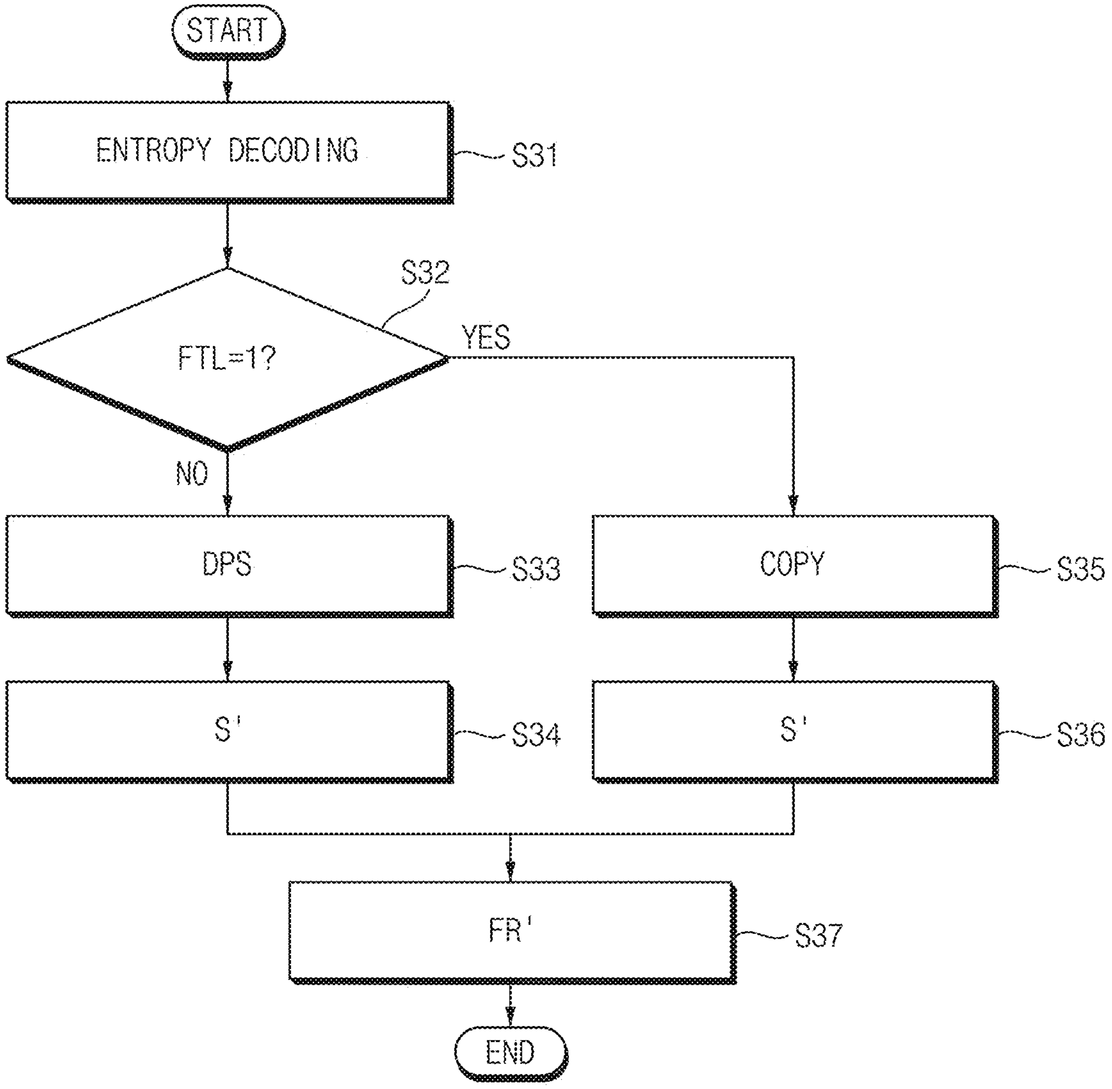
FIG. 6 is a flowchart illustrating an example of decoding in a data processing method according to example embodiments.

FIG. 6 is a flowchart illustrating an example of decoding in a data processing method according to example embodiments.

Referring to FIGS. 5 and 6, the entropy decoder EDEC may perform entropy decoding to generate the flag FL and the quantized value QV' (S31).

When the flag FL has the second value (e.g., '0') (S32: NO), the decoder 200 may perform sample-by-sample decoding DPS to sequentially decode the quantized values QV' by units of samples (S33) to sequentially generate the reconstructed samples S' corresponding to the non-redundant samples (S34).

When the flag FL has the first value (e.g., '1') (S32: YES), the output circuit OPC may copy the reconstructed samples of the previous sample line (S35) to generate the reconstructed samples S' corresponding to the redundant samples in the current sample line (S36).

The output circuit OPC may generate the reconstructed frame FR' by combining the reconstructed samples S' corresponding to the non-redundant samples generated by performing the sample-by-sample decoding DPS and the reconstructed samples S' corresponding to the redundant samples generated by copying the reconstructed samples of the previous sample line (S37).

The encoded bitstream EBS that is input to the memory device may be reconstructed by the decoder into data that may be utilized for overdriving compensation. The data may be decoded in the order in which the data was encoded, and after detecting a decoded position, the quantized data at that position or the quantized residues of the data may be dequantized by entropy decoding, and the reconstructed samples may be generated by adding the prediction samples with reference to the prediction samples prior to the current sample. The reconstructed samples are passed for predicted data for the next sample and the next sample line, and may be utilized to calculate the number of available bits or utilize explicit information to determine the codec mode structure for the next sample, sample line, and/or slice as lossy or lossless mode. The number of lossy codec modes may be increased or decreased according to example embodiments, and the decoder may use the same number of codec modes as defined in the encoder, or may use a reduced number of codec modes than the number of codec modes in the encoder.

Figure 7:
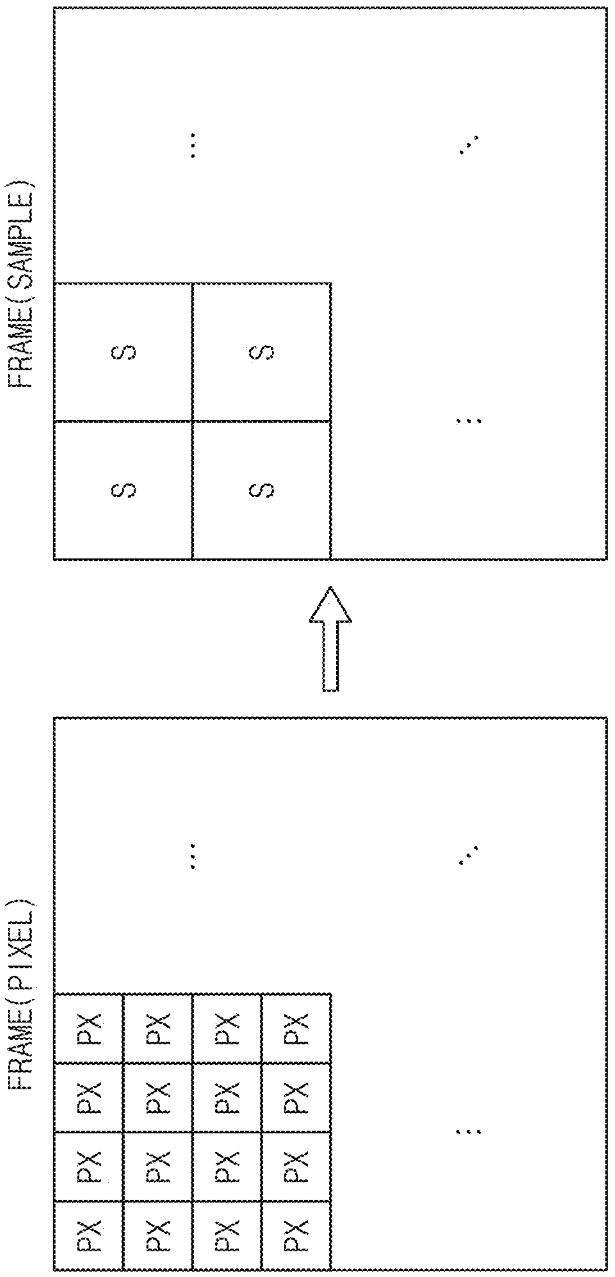
FIGS. 7 and 8 are diagrams illustrating examples of a sample in a data processing method according to example embodiments.
Figure 8:
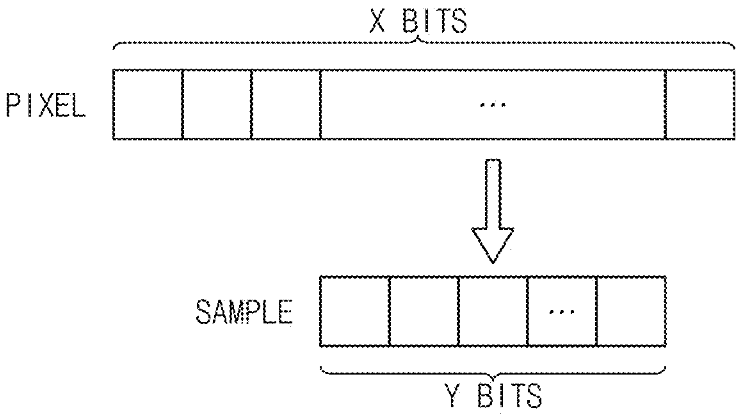

FIGS. 7 and 8 are diagrams illustrating examples of a sample in a data processing method according to example embodiments.

Referring to FIG. 7, in an example embodiment, the sampler SMP of FIG. 3 may group pixels PX of an input image frame FRAME(PIXEL) and generate, based on the grouping, a respective sample S of the input frame FRAME (SAMPLE). For example, embodiments of the present disclosure may include determining the average value of the pixels belonging to a group as the value of the corresponding sample. FIG. 7 illustrates an example of grouping four pixels PX in two rows and two columns into one sample S, but example embodiments are not limited thereto. N rows and N columns of pixels (N is a natural number greater than or equal to 1) may be set as each pixel group, and embodiments of the present disclosure may include determining the value of the corresponding sample based on the average value, maximum value, representative value, variance, or other suitable characteristics of each pixel group.

Referring to FIG. 8, in an example embodiment, the sampler SMP of FIG. 3 may generate or output samples in which each sample has a smaller quantity of bits compared to a corresponding pixel (or compared to corresponding pixels). For example, the sampler SMP may scale each pixel to a sample having a reduced quantity of bits compared to the pixel. In an example, the sampler SMP may downscale a pixel of X bits to a sample of Y (where Y is a natural number smaller than X) bits. For example, the sampler SMP may truncate a pixel and generating a corresponding sample by omitting or removing a certain number of less significant bits of the pixel and outputting or maintaining the more significant bits of the pixel.

Figure 9:
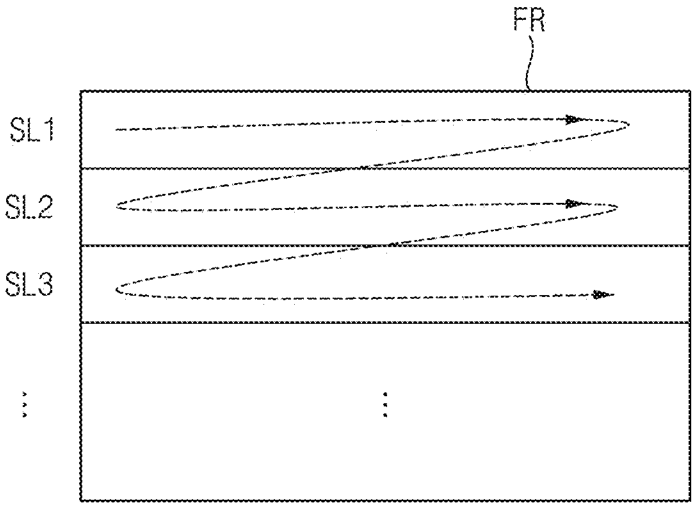
FIGS. 9 and 10 are diagrams illustrating an example order of encoding and decoding in a data processing method according to example embodiments.
Figures 10, 11:
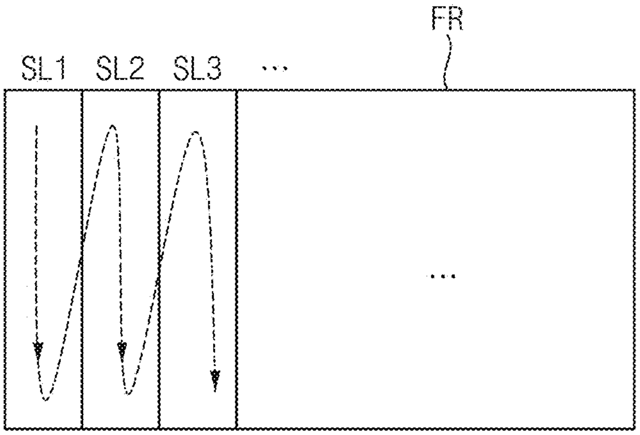
FIGS. 11 and 12 are diagrams illustrating an example of generating an encoded bitstream in a data processing method according to example embodiments.

FIGS. 9 and 10 are diagrams illustrating an example order of encoding and decoding in a data processing method according to example embodiments.

In an example embodiment, as illustrated in FIG. 9, each of the sample lines SL1, SL2 and SL3 of the input frame FR may include samples disposed in a row-wise direction, and encoding and decoding may be performed in a top sample line to bottom sample line direction, and within each sample line, in a left sample to right sample direction.

In an example embodiment, as illustrated in FIG. 10, each of the sample lines SL1, SL2 and SL3 of the input frame FR may include samples disposed in a column direction, and encoding and decoding may be performed from the sample line on the left to the sample line on the right, and from the upper sample to the lower sample within each sample line.

The order of encoding and decoding may be determined variously according to example embodiments. However, the sample-by-sample encoding of the encoder and the sample-by-sample decoding of the decoder are performed in the same manner. For convenience of illustration and description, example embodiments of encoding and decoding performed based on the raster scan method of FIG. 9 will be described herein.

Figure 12:
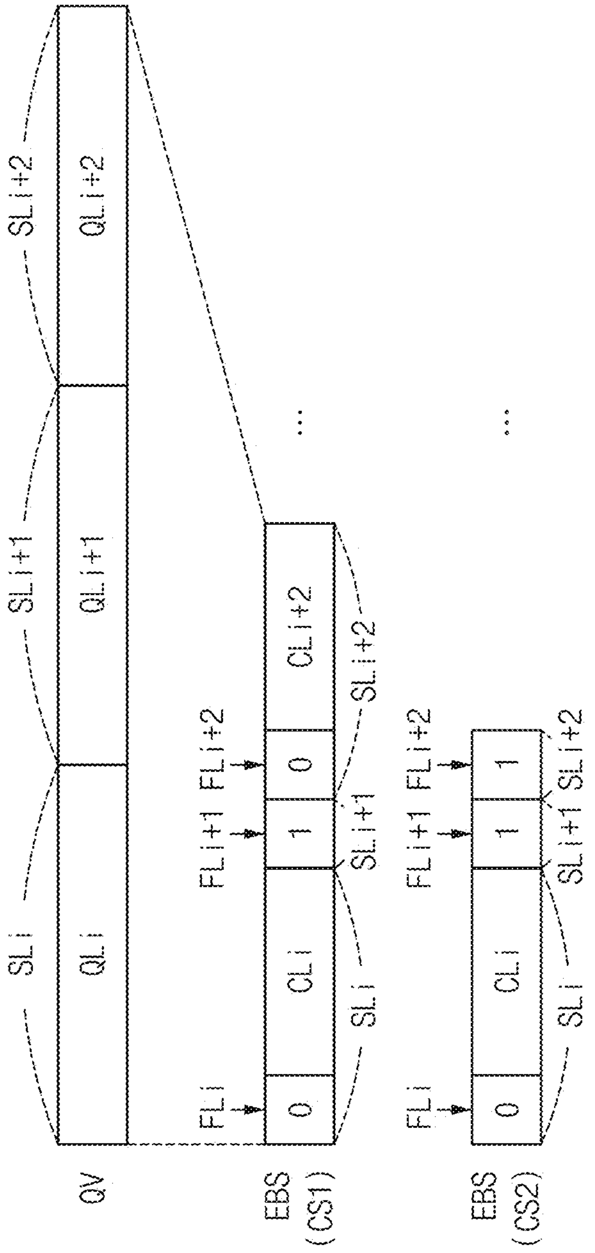

FIGS. 11 and 12 are diagrams illustrating an example of generating an encoded bitstream in a data processing method according to example embodiments.

In FIG. 11, for convenience of illustration and description, an i-th (where i is an integer greater than or equal to 1) sample line SLi and an (i+1)-th sample line SLi+1 included in an input frame are illustrated. The i-th sample line SLi may correspond to a previous sample line that has already been encoded and may include reconstructed samples S'(i,1) through S'(i,k). The (i+1)-th sample line SLi+1 may correspond to the current sample line to be encoded and may include samples S(i+1,1) through (S(i+1,k).

In an example embodiment, the redundancy detector RDD of FIG. 3 may determine the aforementioned similarity based on the absolute value |S(i+1,j)-S(i,j)| of the difference S(i+1,j)-S(i,j) of the current sample S(i+1,j) included in the current sample line (SLi+1), where j is a natural number greater than 1 and less than or equal to k, and the comparison sample S(i+1,j) included in the previous sample line SLi and adjacent to the current sample S(i+1,j). For such similarity determination, the redundancy detector RDD may store samples (S(i,1)-S(i,k) of the previous sample line SLi. In some example embodiments, the reconstructed samples S'(i, 1)-S'(i,k) may be used as comparison samples for the similarity determination instead of the samples S(i,1)-S(i,k) of the previous sample line SLi. In this case, the redundancy detector RDD may store the reconstructed samples S'(i,1) ~S'(i,k) of the previous sample line SLi for the similarity determination.

The similarity determination may be performed on a sample line basis, as will be described herein with reference to FIG. 12, on a sample block basis as will be described herein with reference to FIG. 14, or on a sample-by-sample basis as will be described herein with reference to FIG. 15.

Referring now to FIGS. 11 and 12, the redundancy detector RDD of the encoder 100 of FIG. 3 may determine all samples S(i+1,1)~(S(i+1,k) of the current sample line SLi+1 as the above-described redundant samples, when a summed value $$\sum_{j=1}^{k} |S(i+1, j) - S(i, j)|$$

of absolute values |S(i+1,j)-S(i,j)| with respect to the current sample line SLi+1 is less than or equal to a threshold value, where each absolute value (|S(i+1,j)-S (i,j)| corresponds to a difference between a current sample S(i+1,j) included in the current sample line SLi+1 and a comparison sample S(i,j) included in the previous sample line SLi and adjacent to the current sample S(i+1,j). In some embodiments, the redundancy detector RDD may determine all samples S(i+1,1)~(S(i+1,k) of the current sample line SLi+1 as the above-described non-redundant samples, when the summed value $$\sum_{j=1}^{k} |S(i+1, j) - S(i, j)|$$

is greater than the threshold value. As the threshold value increases, the compression ratio increases, but the loss ratio may also increase. In some embodiments, as the threshold value decreases, the loss ratio may decrease and the loss rate may increase. In an example embodiment, the threshold value may be set to zero for lossless compression.

FIG. 12 illustrates the quantized value QV and the encoded bitstream EBS corresponding to the i-th sample line SLi, the (i+1)-th sample line SLi+1, and the (i+2)-th sample line SLi+2, respectively. In FIG. 12, QLi denotes the quantized value QV corresponding to the i-th sample line SLi, FLi denotes the flag corresponding to the i-th sample line SLi, and CLi denotes the compressed data corresponding to the i-th sample line SLi.

The redundancy detector RDD may append a flag having a first value (e.g., '1') to the encoded bitstream EBS at a position where the compressed data corresponding to the redundant samples is excluded, and the redundancy detector RDD may append a flag having a second value (e.g., '0') to the encoded bitstream at a leading position of the compressed data corresponding to the non-redundant samples.

A first case CS1 of FIG. 12 illustrates a case where the (i+1)-th sample line SLi+1 is similar to the i-th sample line SLi and the (i+2)-th sample line SLi+2 is not similar to the (i+1)-th sample line SLi+1. In this case, the redundancy detector RDD may set the flag FLi corresponding to the non-redundant samples of the i-th sample line SLi to the value of '0', the flag FLi+1 corresponding to the redundant samples of the (i+1)-th sample line SLi+1 to the value of '1', and the redundancy detector RDD may set the flag FLi+2 corresponding to the non-redundant samples of the (i+2)-th sample line SLi+2 to the value of '0'.

The entropy encoder EENC of FIG. 3 may append the flag FLi having the value of '0' to the encoded bitstream EBS at a leading position of the compressed data CLi corresponding to the non-redundant samples of the i-th sample line SLi, append the flag FLi+1 having the value of '1' to the encoded bitstream EBS at a position where the compressed data CLi+1 corresponding to the redundant samples of the (i+1)-th sample line SLi+1 is excluded, and append the flag FLi+2 having the value of '0' to the encoded bitstream EBS at a leading position of the compressed data CLi+2 corresponding to the non-redundant samples of the (i+2)-th sample line SLi+2. The decoder 200 of FIG. 5 may copy the reconstructed samples of the i-th sample line SLi to generate the reconstructed samples of the (i+1)-th sample line SLi+1 by referring to the flag FLi+1 having the value of '1'.

A second case CS2 of FIG. 12 illustrates a case where the (i+1)-th sample line SLi+1 is similar to the i-th sample line SLi and the (i+2)-th sample line SLi+2 is similar to the (i+1)-th sample line SLi+1. In this case, the redundancy detector RDD may set the flag FLi corresponding to the non-redundant samples of the i-th sample line SLi to the value of '0', set the flag FLi+1 corresponding to the redundant samples of the (i+1)-th sample line SLi+1 to the value of '1', and set the flag FLi+2 corresponding to the redundant samples of the (i+2)-th sample line SLi+2 to the value of '1'.

The entropy encoder EENC of FIG. 3 may append the flag FLi having the value of '0' to the encoded bitstream EBS at a leading position of the compressed data CLi corresponding to the non-redundant samples of the i-th sample line SLi, append the flag FLi+1 having the value of '1' to the encoded bitstream EBS at a position where the compressed data CLi+1 corresponding to the redundant samples of the (i+1)-th sample line SLi+1 is excluded, and append the flag FLi+2 having the value of '1' to the encoded bitstream EBS at a position where the compressed data CLi+2 corresponding to the redundant samples of the (i+2)-th sample line SLi+2 is excluded. The decoder 200 of FIG. 5 may copy the reconstructed samples of the i-th sample line SLi to generate the reconstructed samples of the (i+1)-th sample line SLi+1 and the (i+2)-th sample line SLi+2 by referring to the flags FLi+1 and FLi+2 having the value of '1'.

Figure 13:
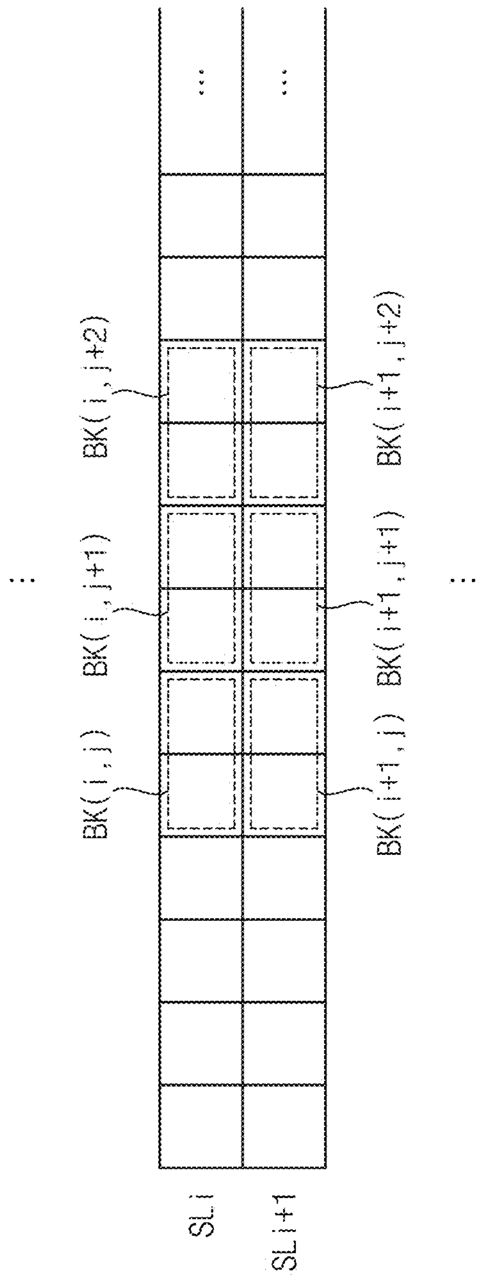
FIGS. 13, 14 and 15 are diagrams illustrating examples of generating an encoded bitstream in a data processing method according to example embodiments.
Figure 14:
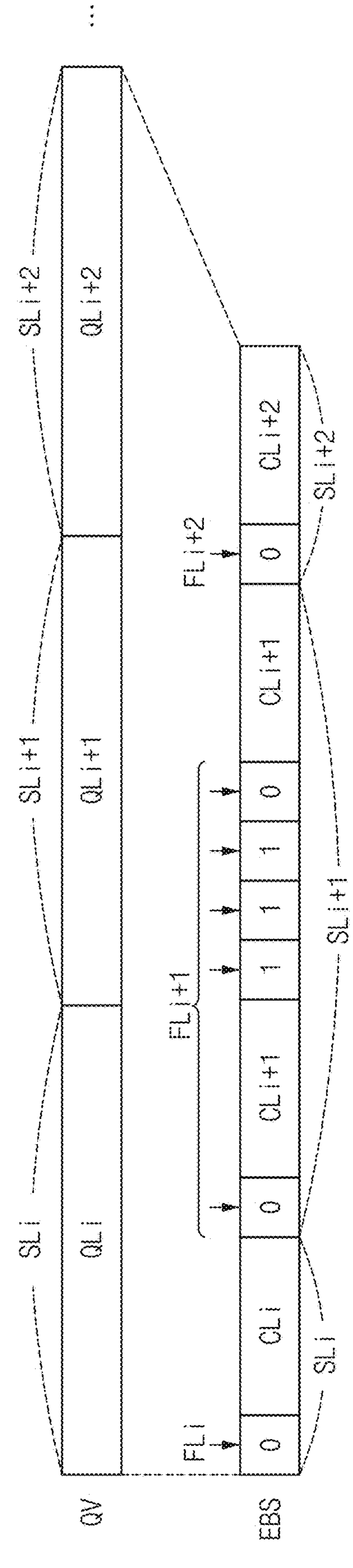
Figure 15:
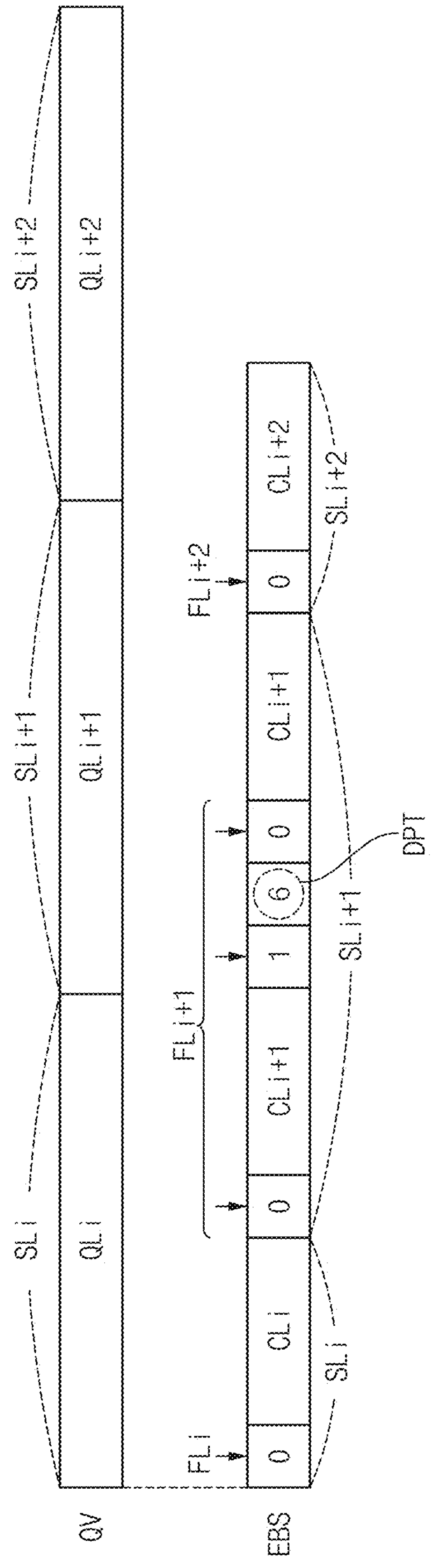

FIGS. 13, 14, and 15 are diagrams illustrating examples of generating an encoded bitstream in a data processing method according to example embodiments. Hereinafter, descriptions that are redundant with FIGS. 11 and 12 may be omitted.

Referring to FIG. 13, the encoder 100 of FIG. 3 may group the samples included in each sample line into a plurality of sample blocks BK such that each sample block has a fixed number of samples, and determine the aforementioned similarity on a sample block-by-sample block basis. An example embodiment of grouping two samples into one sample block is illustrated in FIG. 13, but the number of samples included in a sample block may be varied.

The redundancy detector RDD of the encoder 100 of FIG. 3 may determine all samples of each sample block as the redundant samples when a summed value of absolute values |S(i+1,j)-S(i,j)| with respect to each sample block is less than or equal to a threshold value, where each absolute value |S(i+1,j)-S(i,j)| corresponds to a difference between a current sample S(i+1,j) included in the current sample line SLi+1 and a comparison sample S(i,j) included in the previous sample line SLi and adjacent to the current sample S(i+1,j).

FIG. 14 illustrates a case where the three sample blocks BK(i+1,j), BK(i+1,j+1) and BK(i+1,j+2) included in the (i+1)-th sample line SLi+1 are similar to the three sample blocks BK(i,j), BK(i,j+1) and BK(i,j+2) included in the i-th sample line SLi, respectively. In this case, the redundancy detector RDD may set the flag FLi corresponding to the non-redundant samples of the i-th sample line SLi to the value of '0', set the flag FLi+1 corresponding to the non-redundant samples of the (i+1)-th sample line SLi+1 to the value of '0', set the flag FLi+1 corresponding to the redundant samples of the (i+1)-th sample line SLi+1 to the value of '1', and set the flag FLi+2 corresponding to the non-redundant samples of the (i+2)-th sample line SLi+2 to the value of '0'.

The entropy encoder EENC of FIG. 3 may receive the quantized values QV from the quantizer QTZ on a sample-by-sample basis and the flags FL from the redundancy detector RDD on a sample block basis (e.g., every two samples in the case of FIG. 13). The entropy encoder EENC may append to the encoded bitstream EBS the flag FLi having the value of '0' at a leading position of the compressed data CLi corresponding to the non-redundant samples of the i-th sample line SLi, append to the encoded bitstream EBS the flags FLi+1 having a value of '1' at positions where the compressed data CLi+1 corresponding to the three sample blocks BK(i+1,j), BK(i+1,j+1) and BK(i+1,j+2) of the (i+1)-th sample line SLi+1 is excluded, and append to the encoded bitstream EBS the flags 2FLi+2 having the value of '0' at a leading position of the compressed data CLi+2 corresponding to the non-redundant samples of the (i+2)-th sample line. The decoder 200 of FIG. 5 may determine that the compressed data corresponds to the non-redundant samples until the value of '1' appears at the position of the flag. The decoder 200 of FIG. 5 may generate the reconstructed samples of the three sample blocks BK(i, j), BK(i,j+1) and BK(i,j+2) of the (i+1)-th sample line SLi+1 by copying the reconstructed samples of the three sample blocks BK(i,j), BK(i,j+1) and BK(i,j+2) of the i-th sample line SLi+1 with reference to the flag FLi+1 having the value of '1'.

FIG. 15 illustrates an example of determining similarity on a sample-by-sample basis.

The redundancy detector RDD of the encoder 100 of FIG. 3 may determine the current sample S (i+1,j) as a redundant sample as described herein if the absolute value |S(i+1,j)-S (i,j)) of the difference between the current sample S(i+1,j) included in the current sample line SLi+1 and the comparison sample S(i,j) included in the previous sample line SLi and adjacent to the current sample S(i+1,j) is below the threshold value. In other words, the redundancy detector RDD may append a flag FLi+1 having the first value, for example, a value of '1', to the encoded bitstream EBS at a position where the compressed data corresponding to the redundant samples is excluded, and the redundancy detector RDD may append a redundancy depth value DPT indicating the number of the redundant samples consecutive to the position downstream of the flag FLi+1 having the value of '1' to the encoded bitstream EBS.

Whereas in the example embodiment of FIG. 14, the three flags FLi+1 with the value of '1' representing three sample blocks BK(i+1,j), BK(i+1,j+1) and BK(i+1,j+2) corresponding to six redundant samples are included in the encoded bitstream EBS, In the example embodiment of FIG. 15, one flag FLi+1 having the value of '1' and the redundancy depth value DPT indicating the number of redundant samples (e.g., '6') may be included in the encoded bitstream EBS.

The decoder 200 of FIG. 5 may determine that the compressed data corresponds to non-redundant samples until the value of '1' appears in the position of the flag. Further, the decoder 200 may determine that the value following the flag with the value of '1' is the redundancy depth value DPT. The decoder 200 may extract the flag FL and the redundancy depth value DPT from the encoded bitstream ESB including such flag information, and may perform decoding based on the flag FL and the redundancy depth value DPT.

The decoder 200 may, if the flag FL has the first value (e.g., a value of '1'), copy the reconstructed samples of the previous sample line SLi to generate reconstructed samples corresponding to the redundant samples of the current sample line SLi+1. For example, the decoder 200 may generate the reconstructed samples corresponding to the redundant samples of the current sample line SLi+1, using the copies of the reconstructed samples of the previous sample line SLi. The decoder 200 may, if the flag FL has the second value (e.g., a value of '0'), decompress the compressed data disposed after the flag FL on a sample-by-sample basis to generate the reconstructed samples corresponding to the non-redundant samples of the current sample line SLi+1. For example, the decoder 200 may generate the reconstructed samples corresponding to the non-redundant samples of the current sample line SLi+1, by decompressing the compressed data disposed after the flag FL on a sample-by-sample basis.

Figure 16:
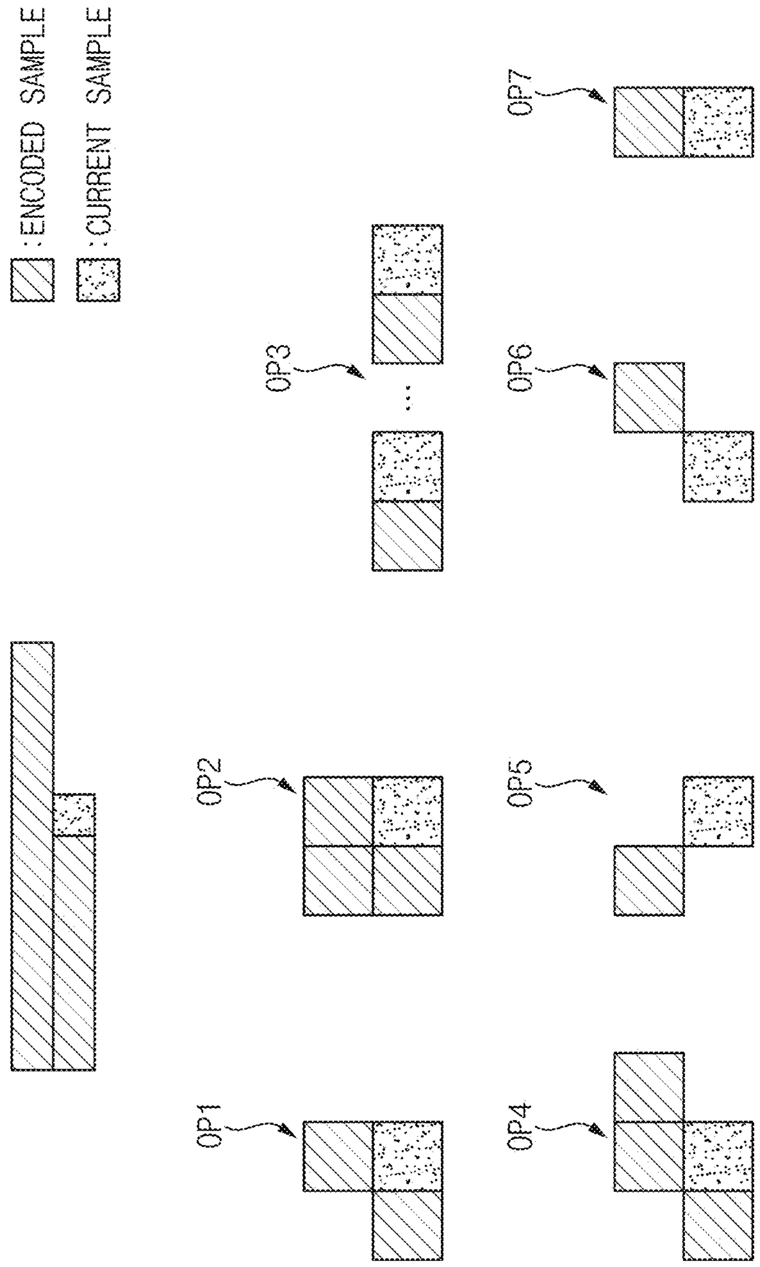
FIG. 16 is a diagram illustrating examples of prediction options in a data processing method according to example embodiments.
Figure 17:
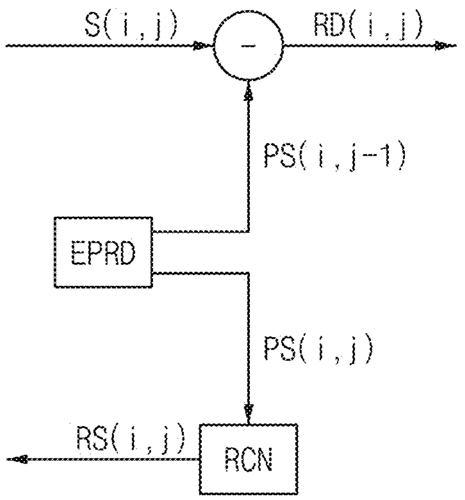
FIG. 17 is a diagram illustrating an example of determining an encoding selection option in a data processing method according to example embodiments.

FIG. 16 is a diagram illustrating examples of prediction options in a data processing method according to example embodiments, and FIG. 17 is a diagram illustrating an example of determining an encoding selection option in a data processing method according to example embodiments.

Referring to FIG. 16, the encoder 100 of FIG. 3 may determine an encoding selection option among a plurality of prediction options OP1 through OP7 corresponding to different combinations of neighboring samples adjacent to a current sample to be encoded. The encoder 100 may generate a prediction sample for encoding the current sample based on reconstructed samples corresponding to the neighboring samples according the encoding selection option.

The encoder 100 may generate the prediction sample using one of the plurality of prediction options OP1 through OP7 of FIG. 16. The seven prediction options OP1 through OP7 illustrated are some examples of prediction utilizing already encoded samples. Embodiments of the present disclosure support modifying or adding to the sample information to be referenced in the prediction. For the first prediction option OP1, the encoder 100 may provide the average value of the immediately preceding encoded sample from the current sample and the sample immediately above the current sample as the prediction sample. For the second prediction option OP2, the encoder 100 may provide the average value of the samples to the left, top left, and top from the current sample as the prediction sample. In the case of the third prediction option OP3, the encoder 100 may determine the prediction sample by averaging the n samples encoded immediately before the current sample on the same sample line, or by determining the most similar sample, wherein the n coded samples may be added or deleted within the available range. In this way, an optimal prediction option may be selected from the plurality of prediction options OP1 through OP7, and the neighboring encoded samples may be utilized to provide a prediction sample for encoding the current sample.

Embodiments of the present disclosure support using a plurality of prediction options, in which each prediction option may be explicitly encoded by assigning a predetermined bit value, or all samples may be implicitly encoded in the same way by selecting only one of the plurality of prediction options.

Embodiments of the present disclosure support using multiple prediction options to make a sample-by-sample prediction, in which the prediction sample corresponding to the current sample may be generated by inheriting the best prediction option or prediction direction of the previously encoded parent sample of the current sample and omitting information about the prediction options.

Referring to FIG. 17, the encoder 100 of FIG. 3 may determine an encoding selection option from among a plurality of prediction options OP1 through OP7 based on, for example, a parent sample S(i,j−1) that is included in the current sample line SLi and was encoded prior to the current sample S(i,j), when performing encoding for the i-th sample line SLi. In other words, as illustrated in FIG. 17, the predictor EPRD generates a reconstructed sample RS(i,j) for the current sample S(i,j), while the reconstructor RCN, which generates a reconstructed sample RS(i,j) for the current sample (S(i,j)), is provided with a prediction sample PS(i,j) corresponding to the current sample (S(i,j)), while the subtractor that generates the residue RD(i,j) corresponding to the current sample S(i,j) may be provided with the prediction sample PS(i,j−1) corresponding to the parent sample S(i,j−1).

In this case, the decoder 200 of FIG. 5, without receiving any information about the encoding selection option from the encoder 100, may determine an decoding selection option among the plurality of prediction options OP1 through OP7 based on a reconstructed sample S'(i,j−1) that is generated by decoding the compressed data corresponding to the parent sample S(i,j−1). The decoder 200 may generate a prediction sample for decoding the compressed data corresponding to the current sample S(i,j) based on reconstructed samples corresponding to the neighboring samples according to the decoding selection option.

Figure 18:
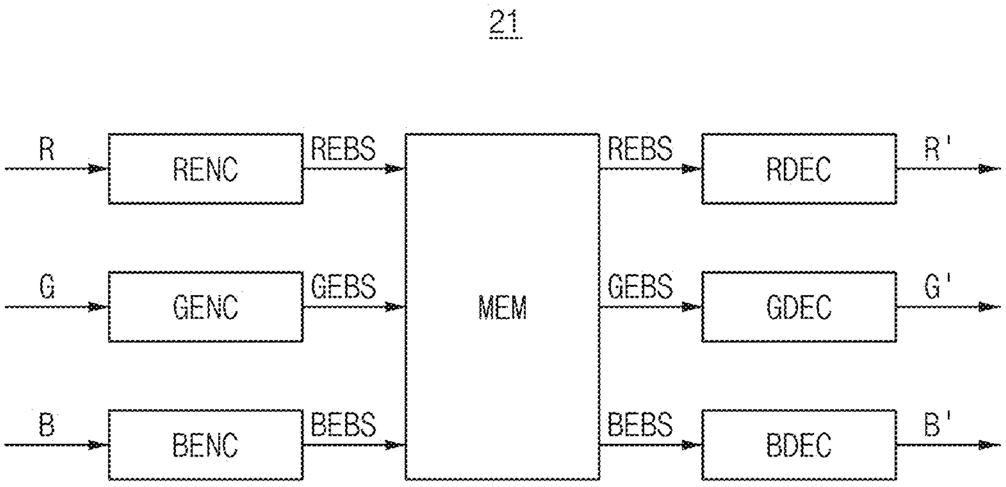
FIGS. 18, 19 and 20 are diagrams illustrating a data processing circuit according to example embodiments.
Figure 19:
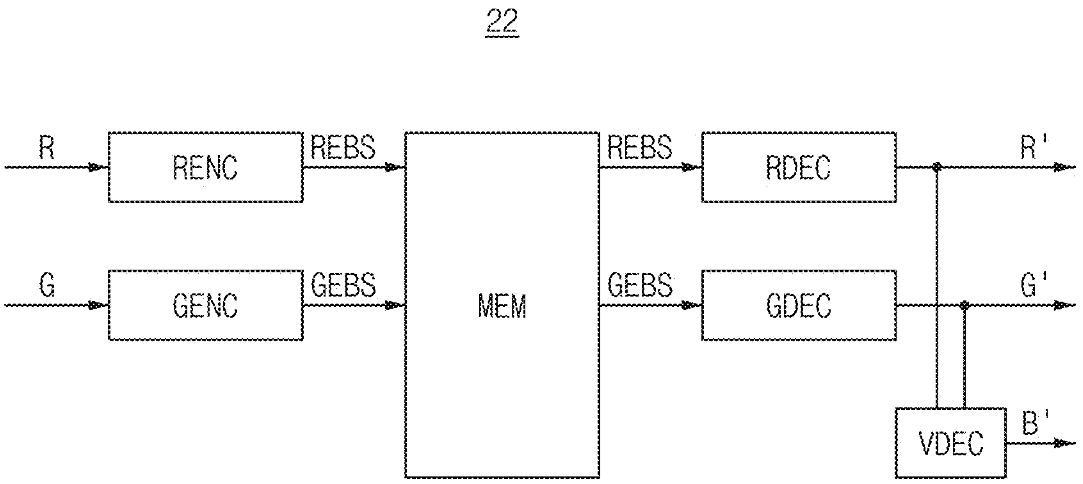
Figure 20:
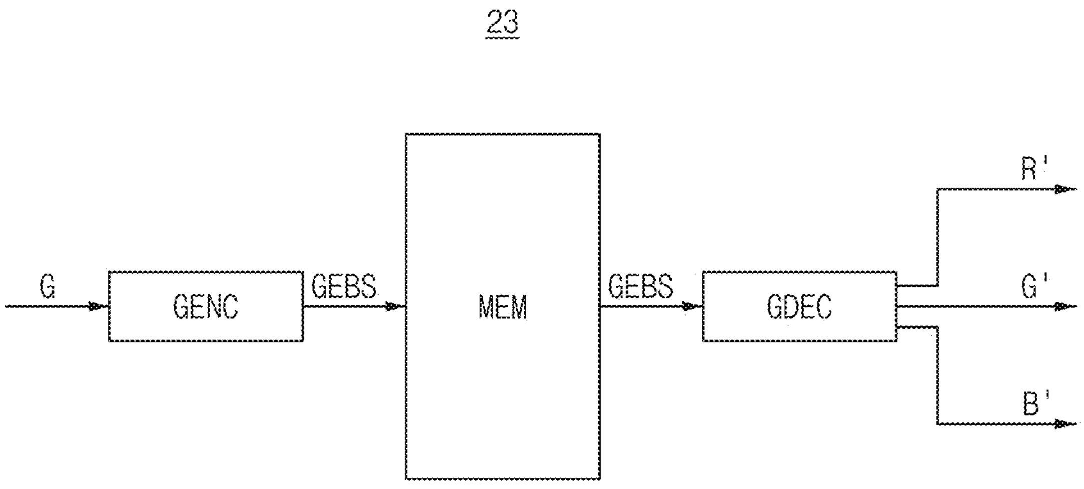

FIGS. 18, 19 and 20 are diagrams illustrating a data processing circuit according to example embodiments.

Although the following description uses the case where the input image data is RGB data as an example, example embodiments may be applied to various color formats, such as, for example, pentile, YCbCr, YCoCg, HSV, CIELAB, CIELUV, and the like, alternative or in addition to RGB format.

Referring to FIG. 18, the data processing circuit 21 may include encoders RENC, GENC and BENC, a memory device MEM, and decoders RDEC, GDEC and BDEC that perform encoding and decoding for the red, green, and blue color channels, respectively.

The red encoder RENC may perform encoding on the red image data R to generate an encoded red bitstream REBS, the green encoder GENC may perform encoding on the green image data G to generate an encoded green bitstream GEBS, and the blue encoder BENC may perform encoding on the blue image data B to generate an encoded blue bitstream BEBS.

The memory device MEM may store the encoded red bitstream REBS, the encoded green bitstream GEBS and the encoded blue bitstream BEBS separately.

The red decoder RDEC may perform decoding on the encoded red bitstream REBS provided from the memory device MEM to generate reconstructed red data R'. The green decoder GDEC may perform decoding on the encoded green bitstream GEBS provided from the memory device MEM to generate reconstructed green data G'. The blue decoder BDEC may perform decoding on the encoded blue bitstream BEBS provided from the memory device MEM to generate reconstructed blue data B'.

Referring to FIGS. 19 and 20, data processing circuits 22 and 23 may omit encoding with respect to at least one color channel among the plurality of color channels. The decoder may generate decoded data of the at least one color channel in which encoding is omitted, based on decoded data of other channels in which encoding is not omitted.

In an example embodiment, as illustrated in FIG. 19, the data processing circuit 22 may include encoders RENC and GENC and decoders RDEC and GDEC for the red and green color channels, and an encoder BENC and a decoder BDEC for the blue color channel may be omitted. In this case, a virtual decoder VDEC may generate the reconstructed blue data B' based on the reconstructed red data G' and the reconstructed green data G'. For example, the virtual decoder VDEC may provide the average of the reconstructed red data G' and the reconstructed green data G' as the reconstructed blue data B'.

In another example embodiment, as illustrated in FIG. 20, the data processing circuit 23 may include an encoder GENC and a decoder GDEC for the green color channel, and encoders RECN and BENC and decoders RDEC and BDEC for the red and blue color channels may be omitted. In this case, the reconstructed green data G' may be provided as reconstructed red data G' and reconstructed blue data B'.

When pixel data or sample data has similar information between channels, especially when the information in each of the channels R, G and B representing gray color is highly similar between channels, the data may be compressed by omitting one or more channel information and coding a flag indicating that compression using single channel information and channel redundancy has been applied. In this case, the information of the representative channel (i.e., the channel that is not omitted) may be losslessly and lossily compressed depending on the purpose, and the reconstructed frame may be decoded according to the compressed form and the information received as a bitstream to form a reconstructed frame. In order to preserve redundancy between channels or certain data and compress the rest of the data, embodiments of the present disclosure support applying different compression rates for each channel by converting to a color space such as, for example, YCbCr, HSV, CIELAB, CIELUV, or other color space that is divided into a brightness axis and a color axis, and then removing redundancy (e.g., removing only redundancy) between color channels.

In an example embodiment, the previous frame data may be compressed in the frequency domain. To remove redundant information when compressing on a full frame basis rather than sample and sample line basis, data compression may be performed by converting the input frames to the frequency domain and then omitting and/or condensing data within a certain frequency range to remove redundant information. The frame data reflecting the reduced and/or omitted frequencies may be converted to the spatial domain to calculate the residues from the original data, quantize the residues, and apply entropy encoding to compress the frame.

Figure 21:
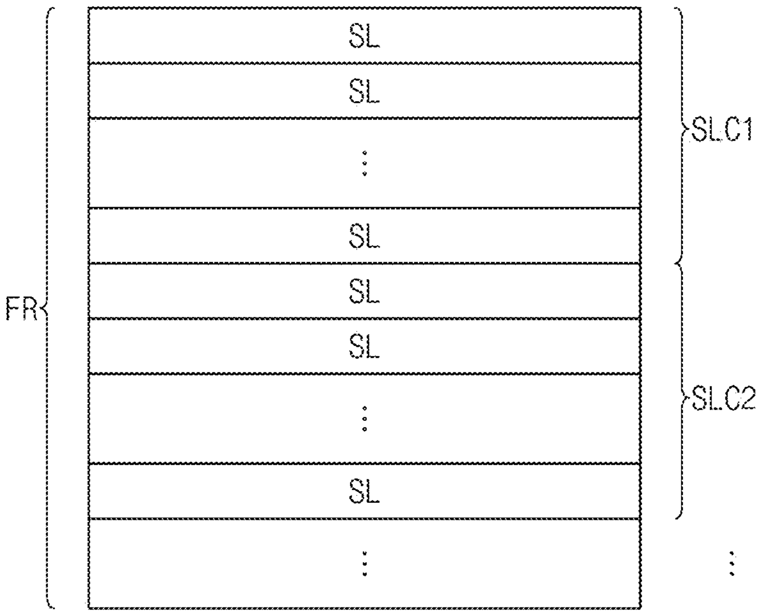
FIGS. 21 and 22 are diagrams illustrating an example of parallel encoding in a data processing method according to example embodiments.
Figure 22:
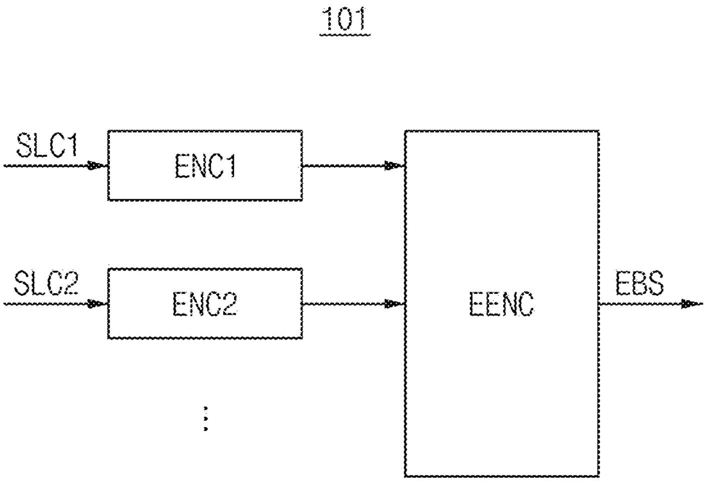

FIGS. 21 and 22 are diagrams illustrating an example of parallel encoding in a data processing method according to example embodiments.

Referring to FIGS. 21 and 22, an encoder 101 may group a plurality of sample lines SL forming an input frame FR into a plurality of slices SLC1 and SLC2 and perform encoding in parallel with respect to the plurality of slices SLC1 and SLC2. The number of the plurality of slices SLC1 and SLC2 included in one input frame FR and the number of sample lines included in one slice may be varied.

The encoder 101 may include a plurality of encoders ENC1 and ENC2 for parallel encoding. A first encoder ENC1 may perform encoding for a first slice SLC1, and a second encoder ENC2 may perform encoding for a second slice SLC2.

In an example embodiment, the encoder 101 may include a single entropy encoder EENC that integrally performs entropy encoding on the values output from the plurality of encoders ENC1 and ENC2 to generate a single encoded bitstream EBS. In some example embodiments, the plurality of encoders ENC1 and ENC2 may each include an entropy encoder for independently performing entropy encoding.

Figure 23:
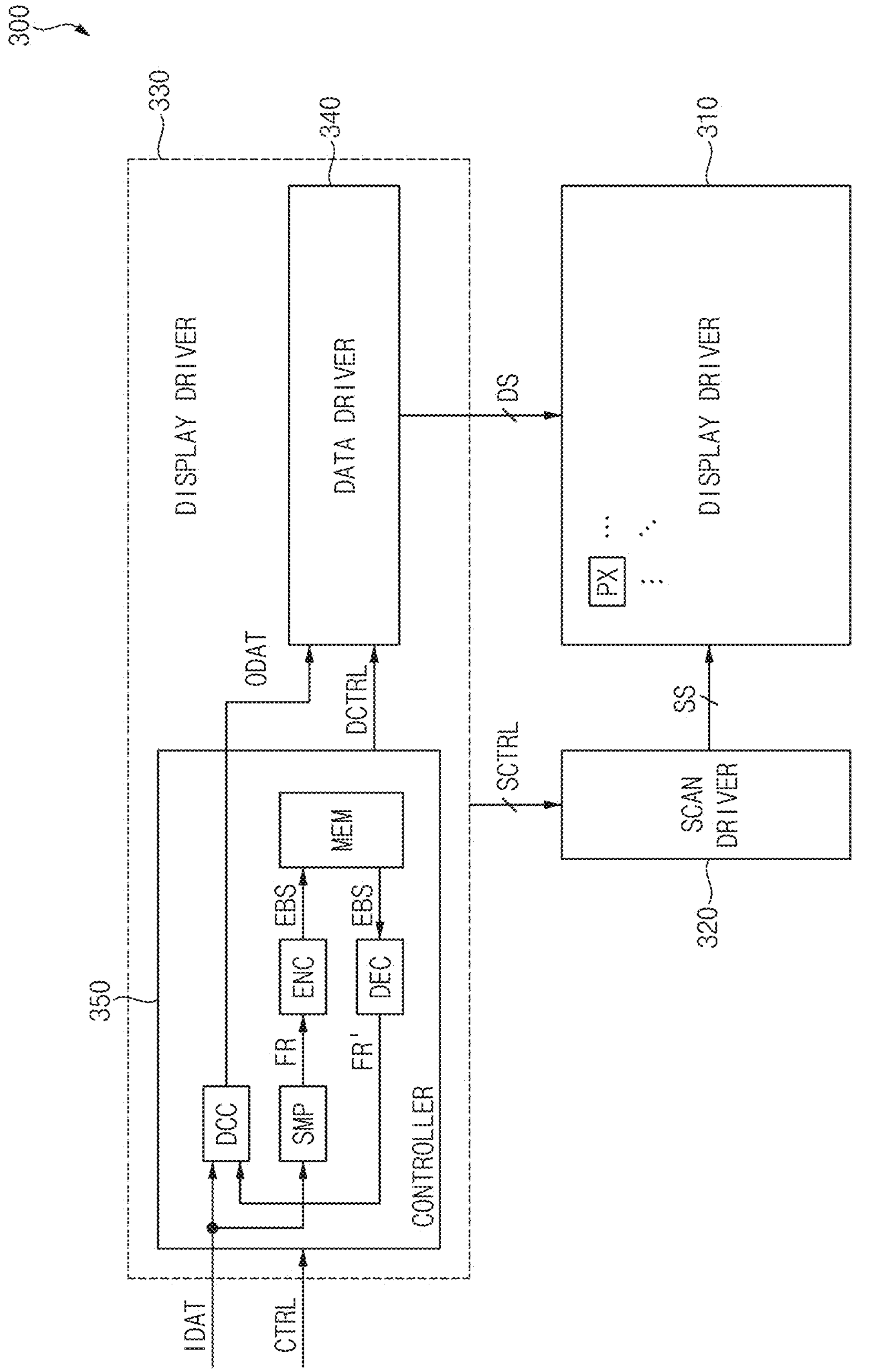
FIG. 23 is a block diagram illustrating a display device according to example embodiments.

FIG. 23 is a block diagram illustrating a display device according to example embodiments.

Referring to FIG. 23, a display device 300 according to example embodiments may include a display panel 310 including a plurality of pixels PX, a scan driver 320 providing scan signals to the plurality of pixels PX, and a display driver 330 driving the display panel 310. The display driver 330 may include a data driver 340 that provides data signals DS to the plurality of pixels PX, and a controller 350 that controls the operation of the display device 300. In an example embodiment, the controller 350 may include a sampler SMP, an encoder ENC, a memory device MEM, a decoder DEC and a data compensation circuit DCC.

The display panel 310 may include a plurality of data lines, a plurality of scan lines, and the plurality of pixels PX associated with the plurality of data lines and the plurality of scan lines. In an example embodiment, each pixel PX may include a light-emitting element, and the display panel 310 may be a light-emitting display panel. For example, the light emitting element may be an organic light emitting diode (OLED), a nano light emitting diode (NED), a quantum dot (QD) light emitting diode, a micro light emitting diode, an inorganic light emitting diode, or any other suitable light emitting element. In other example embodiments, the display panel 310 may be a liquid crystal display (LCD) panel, or any other suitable display panel.

The scan driver 320 may generate scan signals SS based on a scan control signal SCTRL received from the controller 350, and may sequentially provide the scan signals SS to the plurality of pixels PX over the plurality of scan lines in a row-by-row scheme. In an example embodiment, the scan control signal SCTRL may include, but is not limited to, a scan start signal and a scan clock signal. In an example embodiment, the scan driver 320 may be integrated or formed into the display panel 310. In other example embodiments, the scan driver 320 may be implemented as one or more integrated circuits distinct from the display panel 310.

The data driver 340 may generate data signals DS based on output image data ODAT and data control signals DCTRL received from the controller 350, and may provide the data signals DS to the plurality of pixels PX via the plurality of data lines. In an example embodiment, the data control signals DCTRL may include, but are not limited to, an output data enable signal, a horizontal start signal, and a load signal. In an example embodiment, the display driver 330, including the data driver 340 and the controller 350, may be implemented in a single integrated circuit, which may be referred to as a timing controller embedded data driver (TED) integrated circuit. In other example embodiments, the data driver 340 and controller 350 may be implemented as separate integrated circuits.

The controller 350 (e.g., timing controller (TCON)) may receive input image data IDAT and control signals CTRL from an external host processor (e.g., an application processor (AP), a graphics processing unit (GPU), or a graphics card). In an example embodiment, the input image data IDAT may be RGB image data including red image data, green image data, and blue image data. In an example embodiment, the control signal CTRL may include, but is not limited to, a vertical synchronization signal, a horizontal synchronization signal, an input data enable signal, a master clock signal, and the like. The controller 350 may compensate the input image data IDAT to generate the output image data ODAT. Further, the controller 350 may provide the output image data ODAT and data control signals DCTRL to the data driver 340 to control the operation of the data driver 340, and may provide the scan control signals SCTRL to the scan driver 320 to control the operation of the scan driver 320.

In the display device 300 according to example embodiments, the sampler SMP may sample the input image data IDAT to generate an input frame FR including a plurality of samples forming a plurality of sample lines.

The encoder ENC may compress the input frame FR to generate an encoded bitstream EBS, the memory device MEM may store the encoded bitstream EBS, and the decoder DEC may decompress the encoded bitstream EBS provided from the memory device MEM to generate a reconstructed frame FR'.

As described herein, according to example embodiments, the encoder ENC may determine the similarity between the samples of the current sample line to be encoded and the samples of the previous sample line that is previously encoded, determine the samples of the current sample line as redundant samples or non-redundant samples based on the similarity, exclude compressed data corresponding to the redundant samples from the encoded bitstream, and append, to the encoded bitstream, a flag indicating the position of the redundant samples. The decoder DEC may extract the flag from the encoded bitstream EBS provided from the memory device MEM, and may decompress the compressed data of the encoded bitstream EBS based on the flag to generate the reconstructed frame FR'.

The data compensation circuit DCC may compensate the input image data IDAT based on the reconstructed frame FR' to generate the output image data ODAT.

Figure 24:
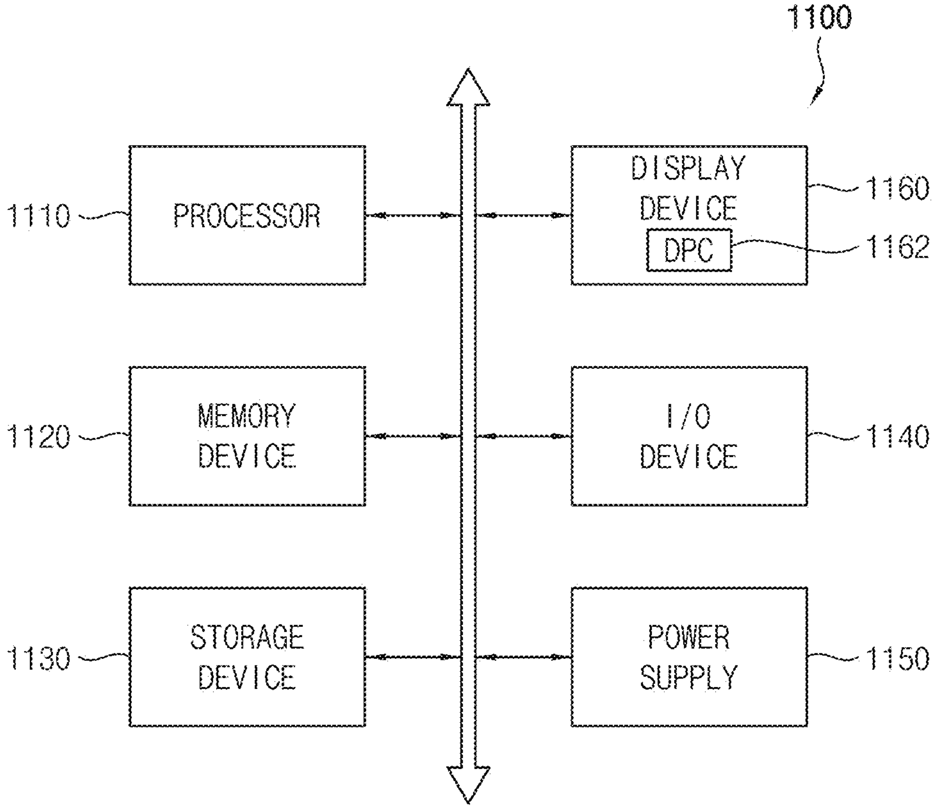
FIG. 24 is a block diagram illustrating an electronic device including a display device according to example embodiments.

FIG. 24 is a block diagram illustrating an electronic device including a display device according to example embodiments.

Referring to FIG. 24, an electronic device 1100 may include a processor 1110, a memory device 1120, a storage device 1130, an input/output device 1140, a power supply 1150, and a display device 1160. The electronic device 1100 may further include multiple ports for communicating with a video card, sound card, memory card, USB device, or the like, or for communicating with other systems.

The processor 1110 may perform calculations or tasks. Depending on the example embodiment, the processor 1110 may be a microprocessor, a central processing unit (CPU), or the like. The processor 1110 may be connected to other components via an address bus, a control bus, a data bus, and the like. Depending on the example embodiment, the processor 1110 may also be connected to an expansion bus, such as, for example, a Peripheral Component Interconnect (PCI) bus.

The memory device 1120 may store data supportive of operation of the electronic device 1100. For example, the memory device 1120 may include erasable programmable read-only memory (EPROM), electrically erasable programmable read-only memory (EEPROM), flash memory, phase change random access memory (PRAM), resistance random access memory (RRAM), nano floating gate memory (NFGM), and polymer random access memory (PoRAM), Non-volatile memory devices such as, for example, Polymer Random Access Memory (PoRAM), Magnetic Random Access Memory (MRAM), Ferroelectric Random Access Memory (FRAM), and the like and/or volatile memory devices such as, for example, Dynamic Random Access Memory (DRAM), Static Random Access Memory (SRAM), Mobile DRAM, and the like.

The storage device 1130 may include a solid state drive (SSD), a hard disk drive (HDD), a CD-ROM, or the like. The input/output devices 1140 may include input device such as, for example, a keyboard, keypad, touchpad, touchscreen, mouse, and the like and output devices such as, for example, speakers, printers, and the like. The power supply 1150 may provide power for operation of the electronic device 1100. The display device 1160 may be connected to other components via the above buses or other communication links.

The display device 1160 may include a data processing circuit (DPC) 1162 as described herein with reference to FIGS. 1 through 23.

As such, In the data processing circuit, the data processing method and the display driver according to example embodiments, by replacing the redundant compressed data with the flags based on the similarity between the encoded comparison sample and the sample to be encoded, the size of the memory device storing data for overdriving compensation may be reduced while minimizing data loss. The encoding time, the decoding time, and the size of the bitstream may be reduced and the performance of the device including the data processing circuit may be improved, by replacing the redundant compressed data with the flags.

According to example embodiments, the electronic device 1100 may be a digital television, a three-dimensional television, a smart phone, a tablet computer, a virtual reality device, a personal computer, a laptop computer, a personal digital assistant (PDA), a portable multimedia player (PMP), a digital camera, a music player, a portable game console, a navigation device, and the like, and may be any electronic device including a display device 1160.

One of ordinary skill in the art will understand that example embodiments may be implemented in the form of systems, methods, products, and the like comprising computer-readable program code stored on a computer-readable medium. The computer-readable program code may be provided to a processor of various computers or other data processing circuits. The computer-readable medium may be a computer-readable signal medium or a computer-readable recording medium. The computer-readable recording medium may be any tangible medium capable of storing or containing a program within or in connection with an instruction-executing system, equipment, or apparatus.

The example embodiments may be applied to any electronic devices and systems. For example, the example embodiments may be applied to systems such as, for example, a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, and the like.

The foregoing is illustrative of example embodiments and is not to be construed as limiting thereof. Although a few example embodiments have been described, those skilled in the art will readily appreciate that many modifications are possible in the example embodiments without materially departing from the example embodiments.

What is claimed is:

1. A data processing circuit to provide data for overdriving compensation of a display device, comprising:

an encoder configured to:

generate an encoded bitstream by compressing an input frame comprising a plurality of samples forming a plurality of sample lines;

determine a similarity between samples of a current sample line to be encoded and samples of a previous sample line that is encoded previously before the current sample line, wherein the samples of the current sample line and the samples of the previous sample line are comprised in the plurality of samples;

determine the samples of the current sample line as redundant samples or non-redundant samples based on the similarity;

exclude compressed data corresponding to the redundant samples from the encoded bitstream;

append to the encoded bitstream a flag having a first value at a position where the compressed data corresponding to the redundant samples is excluded; and append to the encoded bitstream a redundancy depth value at a position after the flag having the first value, wherein the redundancy depth value indicates a number of consecutive redundant samples;

a memory device configured to store the encoded bitstream; and a decoder configured to extract the flag from the encoded bitstream provided from the memory device and generate a reconstructed frame by decompressing the encoded bitstream based on the flag.

2. The data processing circuit of claim 1, wherein the encoder is configured to determine the similarity based on an absolute value of a difference between a current sample comprised in the current sample line and a comparison sample comprised in the previous sample line and adjacent to the current sample.

3. The data processing circuit of claim 1, wherein the encoder is configured to:

append to the encoded bitstream the flag having a second value at a position before the compressed data corresponding to the non-redundant samples.

4. The data processing circuit of claim 1, wherein the encoder is configured to determine all samples of the current sample line as the redundant samples when a summed value of absolute values with respect to the current sample line is less than or equal to a threshold value, where each absolute value corresponds to a difference between a current sample comprised in the current sample line and a comparison sample comprised in the previous sample line and adjacent to the current sample.

5. The data processing circuit of claim 1, wherein the encoder is configured to:

group the samples comprised in the current sample line into a plurality of sample blocks such that each sample block has a fixed number of samples; and determine all samples of each sample block as the redundant samples when a summed value of absolute values with respect to each sample block is less than or equal to a threshold value, where each absolute value corresponds to a difference between a current sample comprised in the current sample line and a comparison sample comprised in the previous sample line and adjacent to the current sample.

6. The data processing circuit of claim 1, wherein the encoder is configured to determine a current sample as the redundant sample when an absolute value of a difference between the current sample comprised in the current sample line and a comparison sample comprised in the previous sample line and adjacent to the current sample is less than or equal to a threshold value.

7. The data processing circuit of claim 1, wherein, when the flag has a first value, the decoder is configured to generate reconstructed samples corresponding to the redundant samples of the current sample line by copying the reconstructed samples of the previous sample line, and wherein, when the flag has a second value, the decoder is configured to generate reconstructed samples corresponding to the non-redundant samples by decompressing the compressed data after the flag having the second value.

8. The data processing circuit of claim 1, wherein the encoder is configured to:

determine an encoding selection option among a plurality of prediction options corresponding to different combinations of neighboring samples adjacent to a current sample to be encoded; and generate a prediction sample for encoding the current sample based on reconstructed samples corresponding to the neighboring samples according to the encoding selection option.

9. The data processing circuit of claim 8, wherein the encoder is configured to determine the encoding selection option based on a parent sample that is comprised in the current sample line and is encoded previously before the current sample, and wherein the decoder is configured to, without receiving information on the encoding selection option from the encoder:

determine a decoding selection option among the plurality of prediction options based on a reconstructed sample that is generated by decoding the compressed data corresponding to the parent sample; and generate a prediction sample for decoding the compressed data corresponding to the current sample based on reconstructed samples corresponding to the neighboring samples according to the decoding selection option.

10. The data processing circuit of claim 1, wherein the encoder is configured to omit encoding with respect to at least one color channel among a plurality of color channels, and wherein the decoder is configured to generate decoded data of the at least one color channel for which encoding is omitted, based on decoded data of other channels in which encoding is not omitted.

11. The data processing circuit of claim 1, wherein the encoder is configured to:

group the plurality of sample lines into a plurality of slices; and perform encoding in parallel with respect to the plurality of slices.

12. The data processing circuit of claim 1, further comprising:

a sampler configured to generate the plurality of samples by:

grouping pixels of input image data; or scaling each pixel to a sample having a reduced quantity of bits compared to the pixel.

13. The data processing circuit of claim 1, wherein the encoder comprises:

a subtractor configured to generate a residue by subtracting a prediction sample from a current sample;

a quantizer configured to generate a quantized value by quantizing the residue;

an entropy encoder configured to generate an encoded bitstream based on the quantized value and the flag;

a reconstructor configured to generate a reconstructed sample based on the quantized value and the prediction sample;

a predictor configured to generate the prediction sample based on reconstructed samples corresponding to previously encoded samples; and a redundancy detector configured to generate the flag based on the reconstructed sample and the current sample.

14. The data processing circuit of claim 1, wherein the decoder comprises:

an entropy decoder configured to generate the flag and a quantized value based on the encoded bitstream;

an inverse quantizer configured to generate a reconstructed residue based on the quantized value and a reconstructed sample;

an adder configured to generate the reconstructed sample by summing the reconstructed residue and a prediction sample;

a predictor configured to generate the prediction sample based on previously decoded reconstructed samples; and an output circuit configured to generate the reconstructed frame based on the reconstructed sample and the flag.

15. A display driver of a display device, comprising:

a sampler configured to generate, by sampling input image data, an input frame comprising a plurality of samples forming a plurality of sample lines;

an encoder configured to:

generate an encoded bitstream by compressing the input frame;

determine a similarity between samples of a current sample line to be encoded and samples of a previous sample line that is encoded previously before the current sample line, wherein the samples of the current sample line and the samples of the previous sample line are comprised in the plurality of samples;

determine the samples of the current sample line as redundant samples or non- redundant samples based on the similarity;

exclude compressed data corresponding to the redundant samples from the encoded bitstream;

append to the encoded bitstream a flag having a first value at a position where the compressed data corresponding to the redundant samples is excluded; and append to the encoded bitstream a redundancy depth value at a position after the flag having the first value, wherein the redundancy depth value indicates a number of consecutive redundant samples;

a memory device configured to store the encoded bitstream;

a decoder configured to extract the flag from the encoded bitstream provided from the memory device and generate a reconstructed frame by decompressing the encoded bitstream based on the flag;

a data compensation circuit configured to generate output image data by compensating the input image data based on the reconstructed frame; and a data driver configured to provide data signals to pixels of the display device based on the output image data.

16. The display driver of claim 15, wherein the encoder is configured to determine the similarity based on an absolute value of a difference between a current sample comprised in the current sample line and a comparison sample comprised in the previous sample line and adjacent to the current sample.

17. The display driver of claim 15, wherein, when the flag has a first value, the decoder is configured to generate reconstructed samples corresponding to the redundant samples of the current sample line by copying the reconstructed samples of the previous sample line, and wherein, when the flag has a second value, the decoder is configured to generate reconstructed samples corresponding to the non-redundant samples by decompressing the compressed data after the flag having the second value.

18. The display driver of claim 15, wherein the encoder is configured to:

determine an encoding selection option among a plurality of prediction options corresponding to different combinations of neighboring samples adjacent to a current sample to be encoded; and generate a prediction sample for encoding the current sample based on reconstructed samples corresponding to the neighboring samples according to the encoding selection option.

19. A data processing circuit to provide data for overdriving compensation of a display device, comprising:

an encoder configured to:

generate an encoded bitstream by compressing an input frame comprising a plurality of samples forming a plurality of sample lines;

determine a similarity between samples of a current sample line to be encoded and samples of a previous sample line that is encoded previously before the current sample line, wherein the samples of the current sample line and the samples of the previous sample line are comprised in the plurality of samples;

determine the samples of the current sample line as redundant samples or non-redundant samples based on the similarity;

exclude compressed data corresponding to the redundant samples from the encoded bitstream; and append to the encoded bitstream a flag indicating a position of the redundant samples;

a memory device configured to store the encoded bitstream; and a decoder configured to extract the flag from the encoded bitstream provided from the memory device and generate a reconstructed frame by decompressing the encoded bitstream based on the flag, wherein the encoder is configured to:

determine an encoding selection option among a plurality of prediction options corresponding to different combinations of neighboring samples adjacent to a current sample to be encoded; and generate a prediction sample for encoding the current sample based on reconstructed samples corresponding to the neighboring samples according to the encoding selection option, wherein the encoder is configured to determine the encoding selection option based on a parent sample that is comprised in the current sample line and is encoded previously before the current sample, and wherein the decoder is configured to, without receiving information on the encoding selection option from the encoder:

determine a decoding selection option among the plurality of prediction options based on a reconstructed sample that is generated by decoding the compressed data corresponding to the parent sample; and generate a prediction sample for decoding the compressed data corresponding to the current sample based on reconstructed samples corresponding to the neighboring samples according to the decoding selection option.

* * * * *